Oct. 22, 1963 K. W. BENHAM 3,107,758
DOOR STRUCTURES AND HINGE ASSEMBLIES
Filed June 24, 1960 7 Sheets-Sheet 1
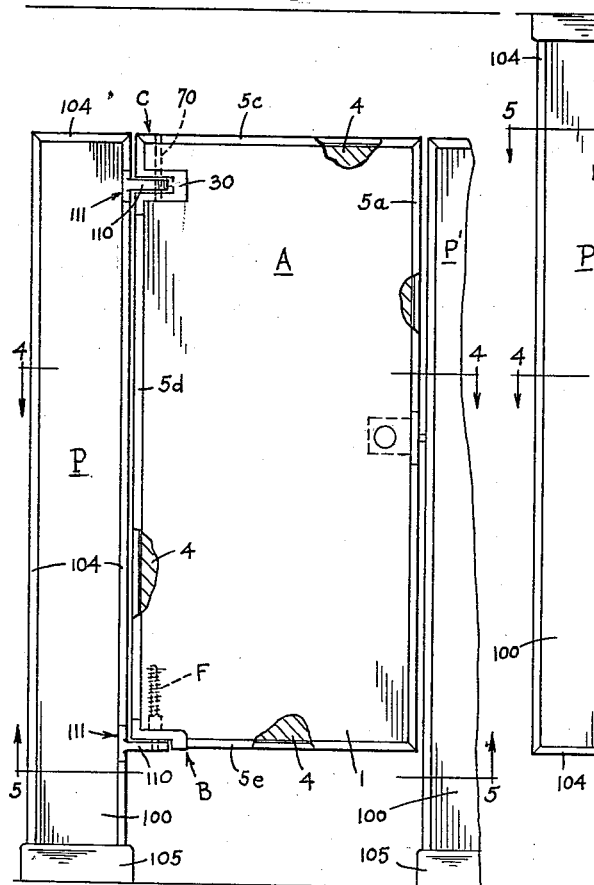
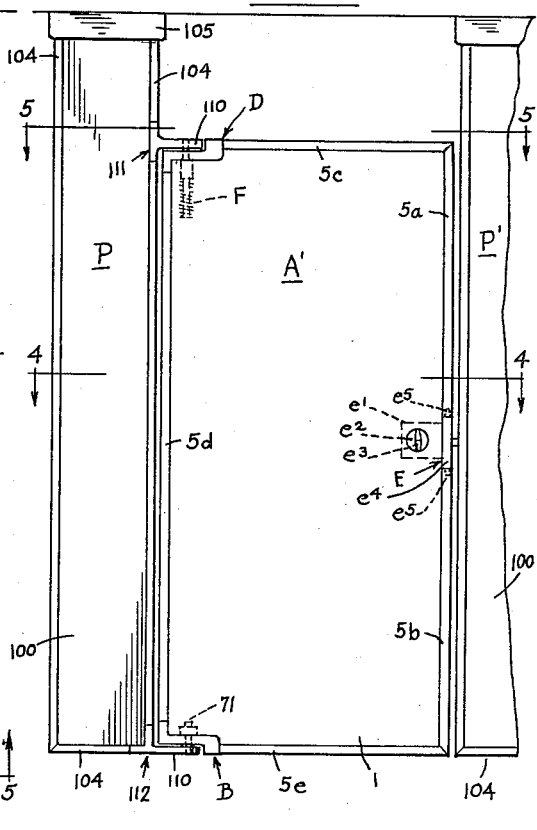
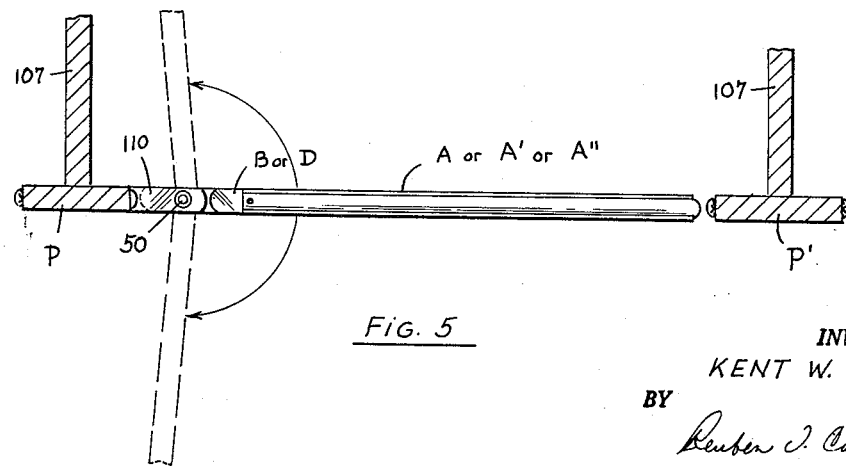
INVENTOR.
KENT W. BENHAM
BY
Reuben J. Carlson
Attorney Oct. 22, 1963  K. W. BENHAM  3,107,758
DOOR STRUCTURES AND HINGE ASSEMBLIES
Filed June 24, 1960  7 Sheets-Sheet 2
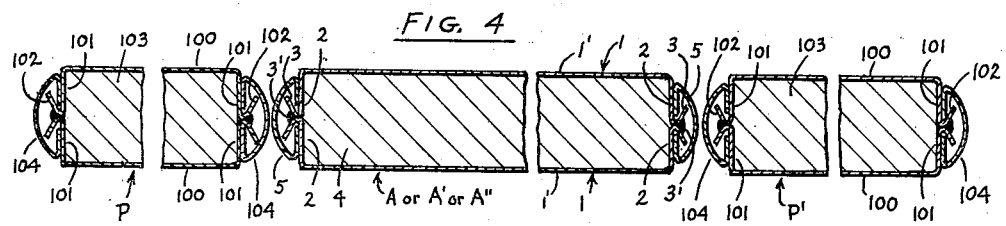
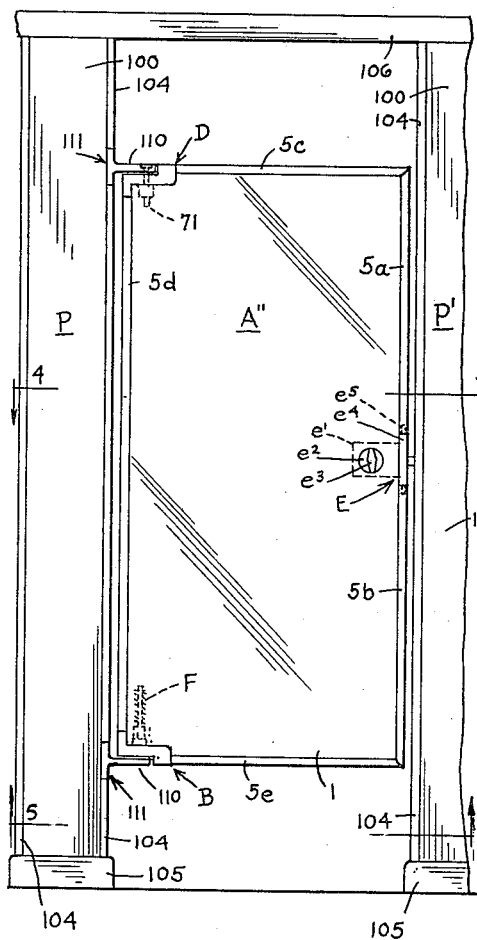
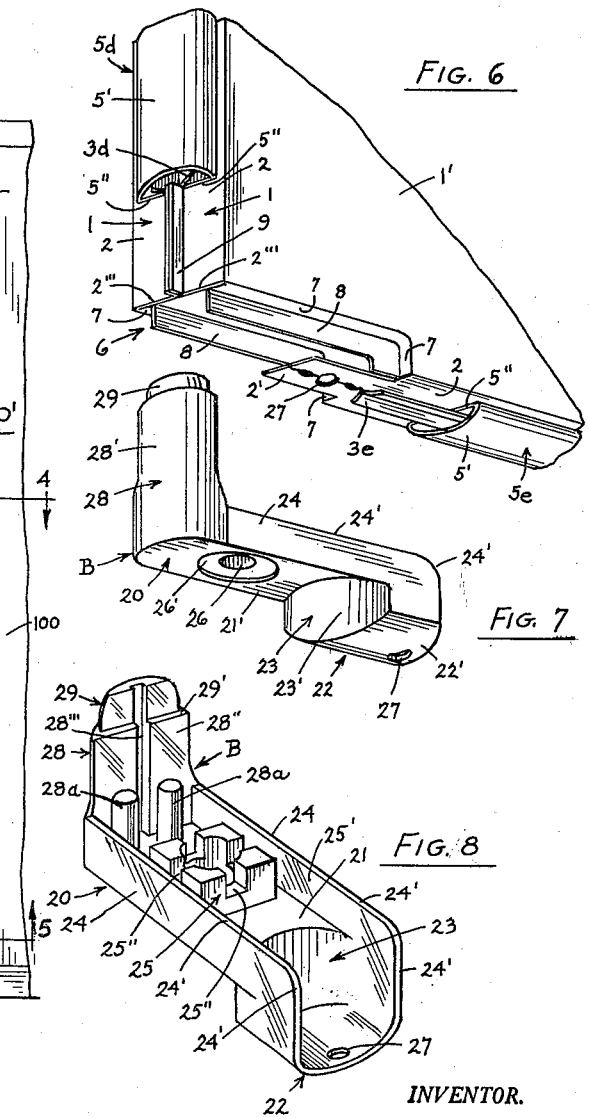
INVENTOR.
KENT W. BENHAM
BY
Reuben J. Carlson
Attorney

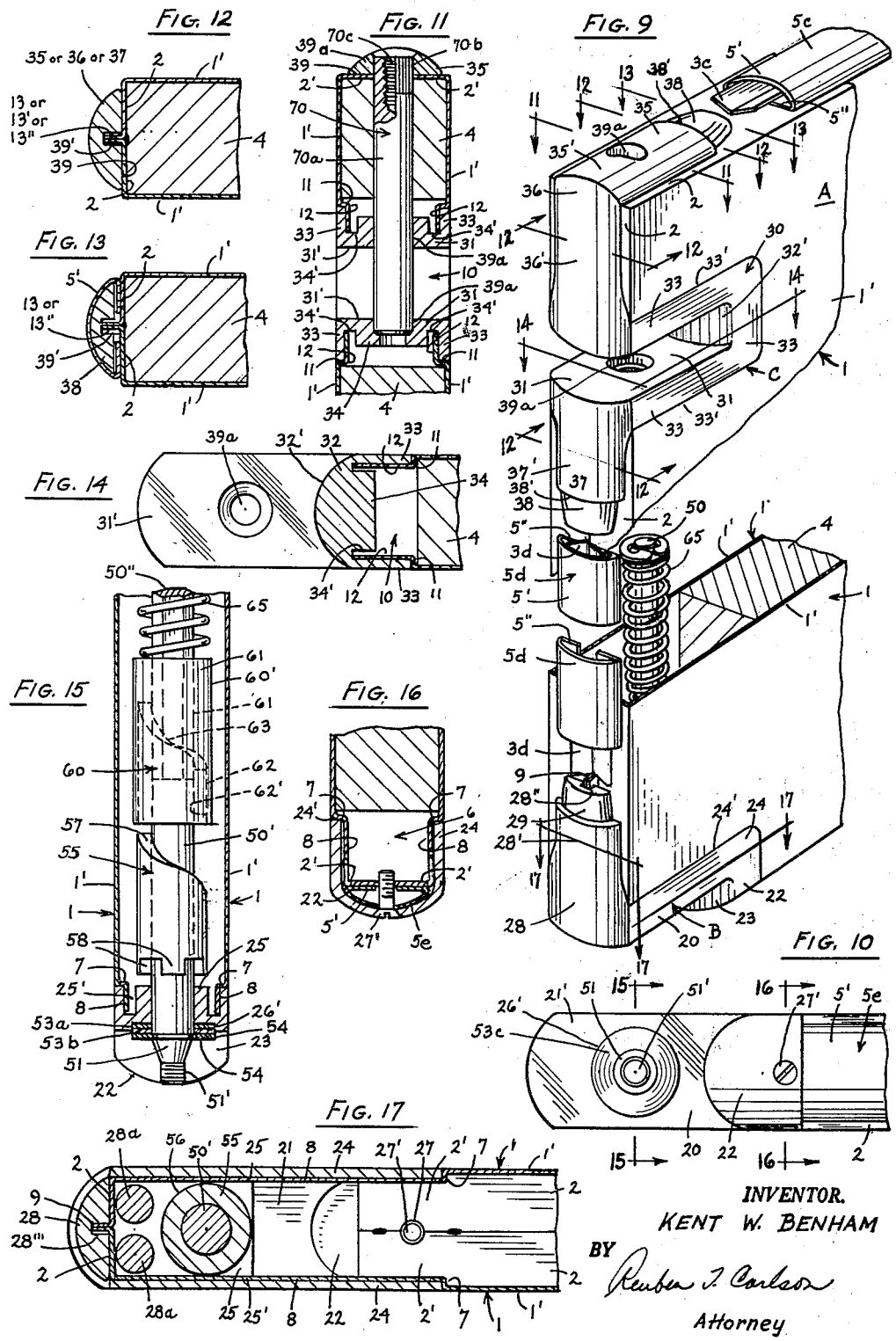

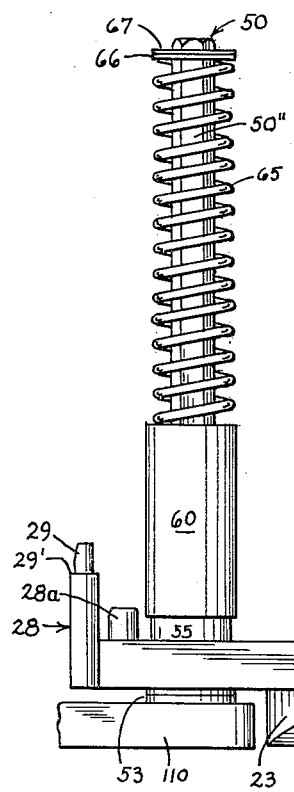
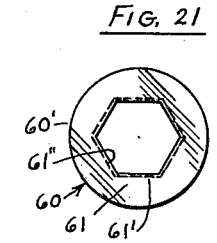
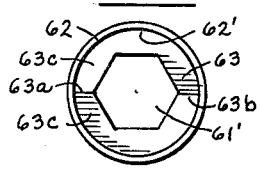
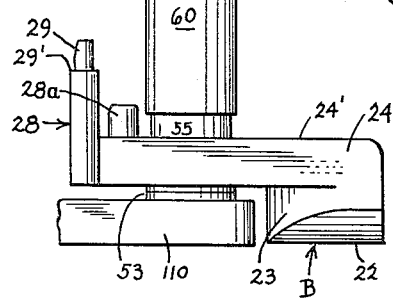
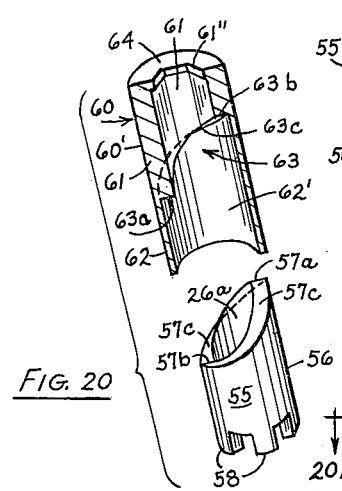
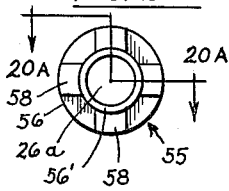
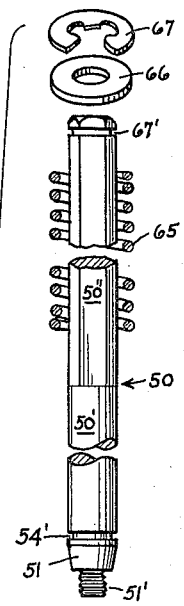
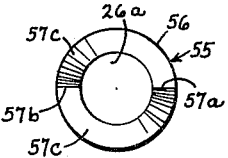
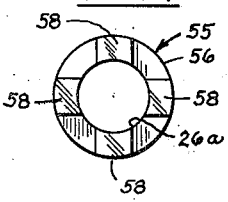
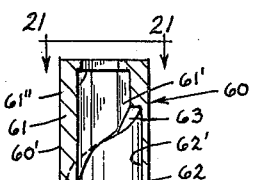
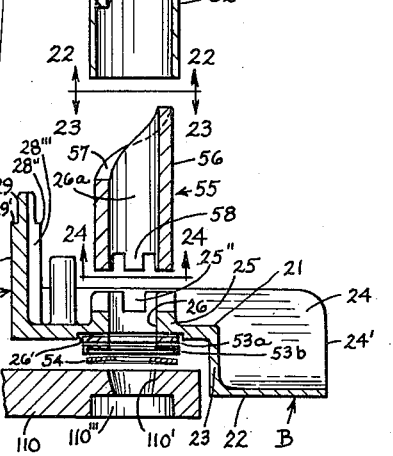
INVENTOR.
KENT W. BENHAM
BY
Reuben I. Carlson
Attorney Oct. 22, 1963

K. W. BENHAM 3,107,758

DOOR STRUCTURES AND HINGE ASSEMBLIES

Filed June 24, 1960

INVENTOR.
KENT W. BENHAM
BY
Reuben I. Carlson
Attorney

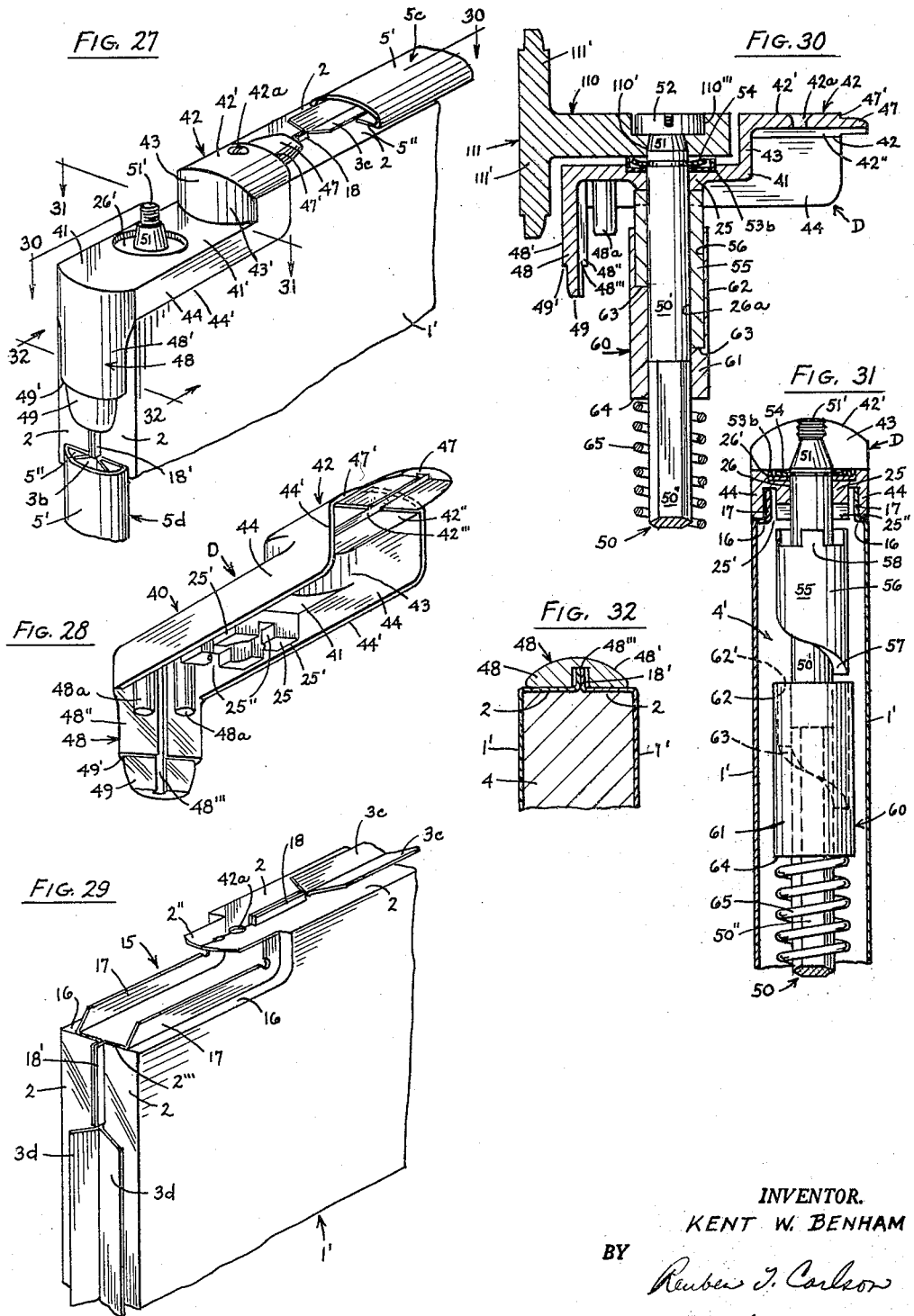

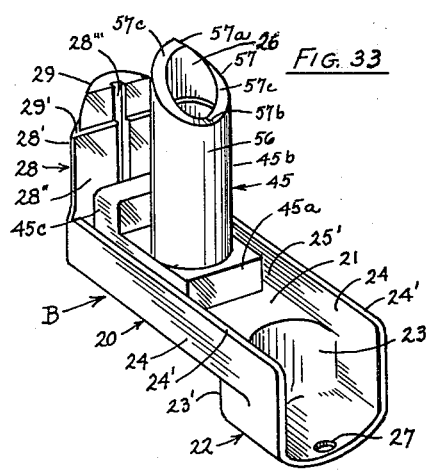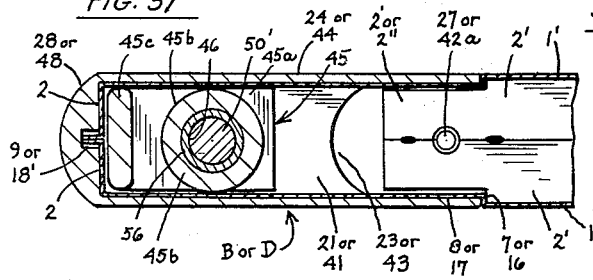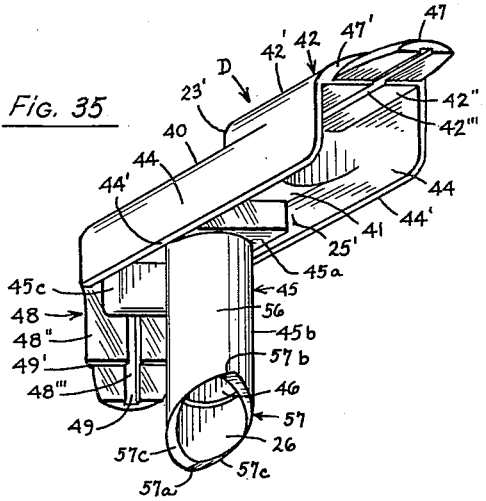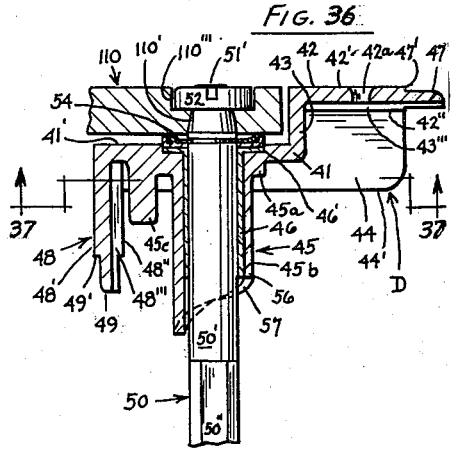

United States Patent Office 3,107,758
Patented Oct. 22, 1963

3,107,758
DOOR STRUCTURES AND HINGE ASSEMBLIES
Kent W. Benham, Gates Mills, Ohio, assignor to The Sanymetal Products Company, Inc., Cleveland, Ohio, a corporation of Ohio
Filed June 24, 1960, Ser. No. 38,648
13 Claims. (Cl. 189—46)

This invention relates to door structures and hinge assemblies designed to form component parts of interior space-dividing cubicles, and in which the door structure incorporates lower and upper hinge pintle receiving brackets designed for convenient mounting connection to fixed hinge members extending from an adjacent floor supported or ceiling hung post or pilaster, and which contains an improved door operating device concealed within the door body and operative to normally maintain the mounted door structure at, and return the manually opened door structure to, a predetermined residence position without vertical movement of the mounted door structure.

This invention is directed to the provision of improved door structures and associated hinge assemblies particularly designed to form component parts of interior partitioning cubicles as installed in ward rooms, dressing rooms and rest rooms of hospitals and office and institutional buildings. The door body and pintle receiving door brackets are formed to snugly interfit and interlock together in rigidly assembled relationship without visible securing means, and in a manner so that the hinge pintle receiving bores of the door brackets as secured to the assembled door structure are maintained in precise alignment. The pintle receiving door brackets as applied to the door body, also present exposed faces which are substantially flush with the exposed side and edge faces of the door body to which they are attached, and so that the wall surfaces of the assembled door structure are substantially free of dirt collecting crevices and projections, and can accordingly be easily cleaned and sanitarily maintained.

This invention also embraces the provision of an improved door operating device whose component parts may be conveniently assembled and connected to one of the door brackets prior to attachment of the door bracket to the door body. When the door bracket and associated door operating device have been assembled to the door body, the door operating device is substantially concealed from exterior view, its hinge pintle may be conveniently connected to the fixed hinging arm of a hinge bracket attached to an adjacent post or pilaster, and automatically operates through forces applied to its associated door bracket to automatically return the opened door structure to a predetermined residence position without vertical movement of the mounted door structure. The door operating device of this invention is composed of relatively few parts, occupies very little space within the door body, can be inexpensively manufactured and quickly installed with minimum labor, operates smoothly and efficiently and substantially without friction, requires no attention after installation, and has a useful life comparable in length to the life of the door structure of which it forms a part.

The door brackets and door operating device of this invention may be made for association with door bodies of any desired thickness, but are particularly adapted for association with relatively thin door bodies having an over-all thickness in the order of three-fourths of an inch to one and one-fourth inches; and while these door brackets may be associated with door bodies formed of wood and like materials, they are particularly designed for association with so-called hollow door bodies whose wall surfaces are formed from spaced metal or plastic facing sheets interiorally strengthened by a reinforcing and sound insulating core.

The lower door bracket associated with the door structure of this invention, is generally angular in form and is designed to interfit with a lower rear corner cut-out formed in the door body. This lower hinge pintle receiving bracket presents a base or arm section having an edge trimming leg projecting from one end thereof, and an off-set saddle section joined to the other end of the arm section by a connecting hip section. The arm section, hip section and saddle section, of this door bracket presents a pair of spaced rim forming flanges designed to interfit and interlock with inset ledge portions which rim the lower corner cut-out in the door body in a manner so that the outer faces of the rim forming flanges are substantially flush with the adjacent facing surfaces of the door body. The edge trimming leg of this lower door bracket presents an inner face designed to firmly seat against the adjacent vertical edge of the door body, and presents an exposed outer face which is symmetrically shaped in contour conformity with the adjacent contoured edge of the door body.

The upper door bracket associated with the door structure of this invention may be generally S-shaped in configuration, and designed to support an upper hinge pintle which is journaled in the bore of a fixed hinging arm extending from an upper pilaster supported hinge bracket. This generally S-shaped door bracket presents a U-shaped saddle part designed to interfit into a corresponding U-shaped cut-out extending into the rear edge of the door body adjacent the upper corner thereof. A pair of longitudinally aligned edge trimming legs extends in opposite directions from the spaced arms of the saddle part, and a third edge trimming leg laterally projects from one of the aligned edge trimming legs to extend along the upper horizontal edge of the door body. The edge trimming legs of this S-shaped bracket present exposed faces which are symmetrically shaped in contour conformity to the adjacent edge surfaces of the door body, and the saddle part presents a pair of rim forming flanges which interfit and interlock with the paired inset ledge portions which rim the U-shaped cut-out in the door body. The rim forming flanges of this bracket are so shaped and proportioned that the outer faces thereof are substantially flush with the adjacent facing surfaces of the door body on which the S-shaped bracket is mounted.

The upper horizontal leg and the spaced arms of this S-shaped door bracket are provided with aligned pintle receiving bores through which the upper hinge pintle extends. The upper hinge pintle is inserted during mounting of the door into these aligned bores, and through a journaling bore formed in the fixed hinging arm of an adjacent pilaster supported hinge bracket and which extends between the spaced arms of the S-shaped door bracket. The hinge pintle is thus effectively braced along the length thereof by the three spaced and aligned bores of the S-shaped door bracket which prevents bending of the hinge pintle when subjected to unusual bending strains which may be imposed on the hinge pintle by external weight applied to the mounted door structure.

Alternatively, this invention also comprehends the provision of an angular shaped upper door bracket which interfits with a corner notch formed in the upper rear corner of the door body, and which may be used as a substitute for the S-shaped upper door bracket. This angular shaped upper door bracket presents a base or arm section having a downwardly projecting edge trimming leg extending from one end thereof, and an upwardly offset saddle section joined to the other end of the arm section by a connecting hip section. The arm section, hip section and saddle section of this angular shaped upper door bracket present a pair of spaced rim forming flanges designed to interfit and interlock with the inset ledge portions which rim the upper corner cut-out of the door body in a manner so that the outer faces of the rim forming flanges are substantially flush with the adjacent facing surfaces of the door body. The downwardly extending edge trimming leg and the saddle section of this upper corner bracket present relatively flat inner faces designed to firmly seat against the adjacent vertical and horizontal edges of the door body, and present exposed outer faces which are symmetrically shaped in contour conformity with the adjacent contoured edges of the door body.

The angular shaped lower door bracket and the angular shaped upper door bracket are each provided with a journal forming boss or member fixed to its base or arm section and designed to extend into the door body. An axial bore extends through the arm section and boss of the angular shaped door bracket which receives the externally supported hinge pintle and on which the door bracket and door body attached thereto are swingably journaled. The bore of the journal forming boss is of substantial length to provide sufficient bracing support for the hinge pintle extending therethrough to prevent bending or deformation of the hinge pintle when unusual external weight strains are applied to the door structure. The bearing forming boss may be formed as an integral part of the arm section of the door bracket, or may be formed as a separate member which is rigidly secured to the bracket arm section.

The bearing forming boss of the door bracket may also be constructed to provide the swinging cam member of the door operating device, by providing the boss with a cylindrical body section whose free end presents a cam track which is inclined with respect to the longitudinal axis of the hinge pintle which extends therethrough. The hinge pintle which forms a part of the door operating device, presents a cylindrical shank section on which the bearing forming boss and associated door bracket is swingably and rotatably journaled; an end section which projects from one end of the cylindrical shank section and exterior to the arm section of the door bracket and which is designed to be rigidly secured to the fixed hinging arm of a pilaster supported hinge bracket; and a polygonally shaped shank section extending from the other end of the cylindrical shank section and beyond the cam track of the journal forming boss. The rotatable cam track presented by the journal forming boss may be substantially continuous, with the valley portion substantially diametrically opposite to the peak portion thereof.

The door operating device further includes a riding cam member which presents a head section having a polygonal bore through which the polygonal shank section of the hinge pintle projects, and which permits the riding cam member to freely telescope without rotation on the polygonal shank section of the hinge pintle. The riding cam member also includes a skirt section extending from its head section which presents a cylindrical bore designed to snugly telescope over the cylindrical body section of the boss fixed to the swingable door bracket, and within which the cylindrical body section of the swingable boss is rotatably journaled. The riding cam member also presents an internal cam track which is complementary to, and designed to ride in camming contact with, the cam track of the swingable boss or cam member fixed to the door bracket. The complementary cam track of the riding cam member is also inclined with respect to the longitudinal axis of the hinge pintle extending therethrough, and presents an inverted peak portion and an inverted valley portion complementary to the valley portion and peak portion of the cam track associated with the swingable journal forming boss or cam member fixed to the door bracket.

A resilient loading force is applied to the riding cam member which maintains its cam track in camming engagement with the cam track of the swingable cam member or boss fixed to the door bracket. The loading force may be applied to the riding cam member by the use of a helical compression spring which is telescoped over the extended polygonal body section of the hinge pintle, with one end of the helical compression spring seated on the adjacent head section of the riding cam member and held under predetermined compression by a head washer and retainer ring fixed to the hinge pintle. The loading force applied by the helical compression spring to the riding cam member is transmitted to the cam track of the swinging cam member or boss and thence to the associated corner bracket fixed to the door body. While the spring weighted riding cam member is free to telescope over the polygonal stem section of the hinge pintle when the mounted door structure is subjected to swinging movement, neither the riding cam member nor the hinge pintle as fixedly secured to the hinging arm of the pilaster supported hinge bracket, are rotated during swinging movement of the mounted door structure, and no twisting strains are imposed on the helical compression spring during swinging movement of the mounted door structure.

It is usually sufficient to apply the door operating device to only one of the door brackets of the door structure, and in such case the door operating device would normally be applied to the lower angular shaped bracket of the door structure. However, the upper angular shaped door bracket is also designed to receive the door operating device, and accordingly, the door operating device of this invention may be selectively applied to either the lower or the upper angular shaped door bracket, or to both the lower and upper angular shaped door brackets in cases where the door is of substantial weight or otherwise offers frictional resistance to swinging movement. The bearing boss associated with both the lower and upper angular shaped door brackets, and formed integral with the bracket or separately formed and fixed thereto, presents a relatively long bearing bore which is designed to selectively receive the cylindrical shank section of the elongated hinge pintle associated with the door operating device or the cylindrical shank section of a simple hinge pintle. The same upper and lower angular shaped door brackets can thus be used to satisfy all hinging conditions.

To insure precise alignment of the hinge pintle bearing bores of both the lower and upper angular shaped door bracket and the upper S-shaped door bracket, and also to fixedly secure the lower and upper brackets to the door body, complementary means are presented by the door brackets and door body to rigidly and precisely interlock the same together. The terminal end of the upwardly extending edge trimming leg of the lower angular shaped door bracket; the downwardly extending edge trimming leg of the upper angular shaped door bracket; and the downwardly extending edge trimming leg of the S-shaped corner bracket, are each provided with a vertically projecting tongue portion designed to be snugly telescoped into and interlock with the adjacent contoured edge formation extending along the rear vertical edge of the door body. The horizontally extending edge trimming leg of the S-shaped corner bracket is also provided with a projecting tongue portion designed to snugly telescope into and interlock with the adjacent contoured edge formation extending along the upper horizontal edge of the door body.

To provide additional securing means, all of the edge trimming legs and associated tongue portions are provided with a longitudinally extending groove designed to interlock with a corresponding rim projecting from the adjacent edge of the door body and against which the inner face of the adjacent edge trimming leg snugly seats. The saddle section of the lower angular shaped door bracket is designed to snugly overlap and receive an end extension of the contoured lower horizontal edge of the door body, and is rigidly secured thereto as by a screw which is substantially invisible when the door structure is mounted in swinging position. The saddle section of the upper angular shaped corner bracket is also designed to snugly receive an end extension of the contoured upper horizontal edge formation of the door body, and may be similarly fixed thereto by a securing screw which is substantially invisible when the door is swingably mounted. In addition, the saddle section of the upper angular shaped door bracket may have a tongue portion designed to telescope and interlock with the adjacent horizontal edge formation of the door body, and a groove may be provided in the inner face of this saddle section and its projecting tongue portion which interlocks with a rib formation projecting from the end extension of the door body. The paired rim forming flanges associated with each of the door brackets also interlock with the shape-conformed inset ledge portions of the door body to further rigidly interlock the door brackets in rigid position. A plurality of concealed securing means are thus provided to rigidly lock the door brackets to the door body, with the pintle receiving bores in precise alignment.

The door body is preferably formed from a pair of pan panel facing sheets which are cut and pressed into pan shaped form and then rigidly secured together, after suitable sound deadening and reinforcing insulation has been sandwiched therebetween. The paired pan shaped facing sheets as secured together present side wall facing sections having inturned flange sections extending around the perimetrical edges thereof, except where interrupted by the notch cut-outs shaped to snugly receive the hinge pintle receiving brackets of this invention. The notch cut-outs formed in the paired facing pans are rimmed by inwardly extending ledge portions shaped to snugly interfit with the paired rim forming flanges of the pintle receiving brackets as applied thereto. The shape conforming ledge portions terminate in projecting flange portions designed to interfit and interlock with concealed grooves presented by the applied hinge pintle supporting bracket.

When the door brackets and concealed door operating device of this invention are applied and secured to the door body, all securing means are substantially concealed from view, with all exposed faces of the corner brackets forming substantially flush joints with the adjacent exposed faces of the door structure, with resultant precise alignment of the hinge pintles which insures accurate hanging of the door. These door brackets may be economically cast or molded in one piece from various metals or resin compounds at substantially less cost than door brackets as heretofore made, and when mounted on the door body, all bracket securing means are concealed from view, presenting a door structure whose side and edge surfaces are substantially free of projections and crevices, and satisfy sanitary requirements to a maximum degree. These improved door brackets and associated door operating device can be quickly applied to the door body during manufacture in substantially less time and at less cost than heretofore required to mount and secure hinge brackets to door structures as heretofore made.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof, in which:

FIG. 1 is an elevational view of a door structure and hinge assembly made in accordance with this invention and as the same appears when swingably mounted on a floor supported pilaster, and wherein the hinge assembly includes a door operating device associated with the lower corner bracket of the door body;

FIG. 2 is an elevational view of a modified form of door structure and hinge assembly made in accordance with this invention and as the same appears when swingably mounted on a ceiling hung pilaster, and wherein the hinge assembly includes a concealed door operating device associated with the upper corner bracket of the door body;

FIG. 3 is an elevational view of a further modified form of a door structure and hinge assembly made in accordance with this invention and as the same appears when swingably mounted on a floor supported pilaster, and wherein the hinge assembly includes a door operating device associated with the lower corner bracket of the door body;

FIG. 4 is a horizontal section of the door body and adjacent hinge supporting and latching pilasters as the same would appear when viewed along line 4—4 of FIGS. 1, 2 or 3, this view showing further structural details of the preferred form of door structure;

Figure 25:
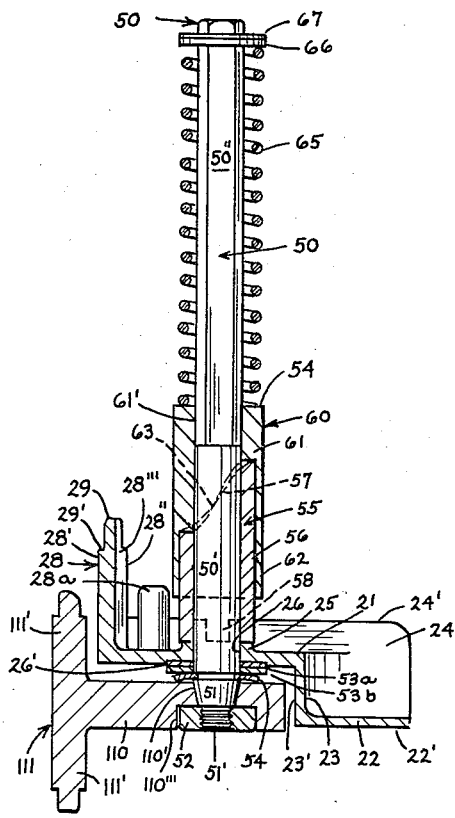
Figure 26:
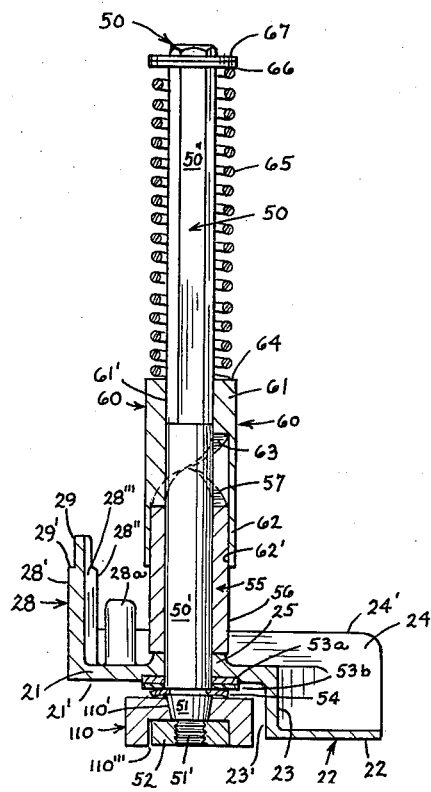

FIG. 5 is a diagrammatic end view of the door structure and horizontal sections of the adjacent hinge supporting and latching pilasters as the same would appear when viewed along line 5—5 of FIGS. 1, 2 or 3, this view illustrating the adaptability of the hinge assemblies and associated door operating device to return the door to residence position when the door has been manually swung in either an inward or outward direction;

FIG. 6 is a fragmentary perspective view showing further details of the lower rear corner of the door body common to the door structures shown in FIGS. 1, 2 and 3, and designed to receive the lower corner bracket and associated hinge pintle of the hinge assembly;

FIG. 7 is a perspective view of the lower corner bracket associated with the door structures shown in FIGS. 1, 2 and 3 and as the same appears prior to its application to the lower rear corner of the door body;

FIG. 8 is another perspective view of the lower corner bracket showing further details thereof;

FIG. 9 is an enlarged fragmentary perspective view of the door structure and hinge assembly shown in FIG. 1, and which illustrates in further detail the upper and lower corner brackets as applied to the door body, including a portion of the door operating device applied to the lower corner bracket and extending into the door body;

FIG. 10 is a fragmentary underface view of the door body and associated lower corner bracket shown in FIG. 9, and which also shows the terminal end of the hinge pintle associated with the door operating device of this invention which projects from the outer face of the lower corner bracket;

FIG. 11 is a fragmentary vertical section of the door body and S-shaped upper corner bracket associated with the door structure shown in FIG. 1, and as the same would appear when the hinge pintle has been applied thereto and viewed along line 11—11 of FIG. 9;

FIG. 12 is a transverse sectional detail of the door body and associated S-shaped upper corner bracket as the same would appear when viewed along any one of the lines 12—12 of FIG. 9;

FIG. 13 is another transverse sectional detail taken through the door body and upper S-shaped corner bracket as the same would appear when viewed along line 13—13 of FIG. 9;

FIG. 14 is a fragmentary transverse section of the door body and S-shaped upper corner bracket as the same would appear when viewed in the plane of line 14—14 of FIG. 9;

FIG. 15 is a fragmentary vertical section taken through the door body and associated lower corner bracket as the same would appear when viewed along line 15—15 of FIG. 10; this view also showing certain parts of the door operating device associated with the lower corner bracket and extending into the door body, including a portion of the hinge pintle which swingably supports the lower corner bracket, the swingable cam member separated from the lower corner bracket, and the reciprocable riding cam member in exploded relation to the swingable cam member, and with both cam members contained within the door body and telescoped over the hinge pintle;

FIG. 16 is a fragmentary vertical section of the door body and associated lower corner bracket as the same would appear when viewed along line 16—16 of FIG. 10;

FIG. 17 is a fragmentary transverse section of the door body and associated lower corner bracket and door operating device as the same would appear when viewed in a horizontal plane along line 17—17 of FIG. 9;

FIG. 18 is an elevational view of the lower corner bracket and associated door operating device as the same would appear when removed from the door structure shown in FIGS. 1, 3 and 9, and when attached to the hinging arm of an adjacent pilaster supported hinge bracket;

FIG. 19 is an exploded view of the door operating device as the same would appear prior to assembly to the lower corner bracket of the door body and prior to attachment to the pilaster supported hinge bracket, certain parts thereof being shown in section to reveal structural details;

FIG. 20 is a perspective view of the cooperating swinging cam member and the riding cam member in exploded relation, the riding cam member being shown in section to reveal further details thereof;

FIG. 20A is an elevational view partly in section, of a modified form of swinging cam member as the same would appear when viewed along line 20A—20A of FIG. 20B, and which features a root forming sleeve section designed to extend into the pintle receiving bore of the door corner bracket to which it is applied;

FIG. 20B is an end face view of the modified swingable cam member shown in FIG. 20A;

FIG. 21 is an end view of the riding cam member as the same would appear when viewed along line 21—21 of FIG. 19;

FIG. 22 is an end view of the opposite end of the riding cam member as the same would appear when viewed along line 22—22 of FIG. 19;

FIG. 23 is an end view of the camming face of the swinging cam member as the same would appear when viewed along line 23—23 of FIG. 19;

FIG. 24 is an end view of the opposite end of the swinging cam member as the same would appear when viewed along line 24—24 of FIG. 19;

FIG. 25 is a vertical section of the door operating device and associated door bracket and pilaster supported hinge bracket in assembled relation and as the same would appear when contained in the door body and when the door body is at residence position, as indicated in full lines in FIG. 5;

FIG. 26 is a vertical section of the door operating device and associated door bracket and pilaster supported hinge bracket as the same would appear when contained within the door body, and when the door body has been swung approximately ninety degrees from its residence position, as indicated in phantom lines in FIG. 5;

FIG. 27 is a fragmentary perspective view of the upper rear corner of the door structure shown in FIG. 2 which has a modified form of upper corner bracket associated with its door body, and which includes the door operating device of this invention extending downwardly into the door body, and which shows the attaching end portion of the hinge pintle projecting from the upper corner bracket;

FIG. 28 is a perspective view of the modified form of upper corner bracket associated with the door structure shown in FIGS. 2 and 27;

FIG. 29 is a fragmentary perspective view of the upper rear corner portion of the door body shown in FIGS. 2 and 27, as the same would appear before the upper corner bracket shown in FIG. 28 has been applied thereto;

FIG. 30 is a vertical section of the upper corner bracket and door operating device as viewed along line 30—30 of FIG. 27, and as the same would appear when the hinge pintle has been attached to the adjacent pilaster supported hinge bracket;

FIG. 31 is a vertical fragmentary section of the door body, upper corner bracket and associated door operating device as the same would appear when viewed along line 31—31 of FIG. 27, this view showing parts of the door operating device such as the elongated hinge pintle, the swinging cam member in exploded relation to the upper corner bracket, and the riding cam member in exploded relation to the swinging cam member;

FIG. 32 is a fragmentary transverse section of the door body and the downwardly extending leg of the upper corner bracket as the same would appear when viewed along line 32—32 of FIG. 27; and FIG. 33 is a perspective view of a modified form of lower corner bracket having an elongated bearing boss formed as an integral part of the corner bracket and which presents a cam track which may be used as the swinging cam component of the door operating device;

FIG. 34 is a vertical section of the modified lower corner bracket shown in FIG. 33 as the same would appear when the hinge pintle has been inserted into the bearing boss and the projecting end of the hinge pintle has been rigidly attached to the hinging arm of a pilaster supported hinge bracket;

FIG. 35 is a perspective view of a modified form of angular shaped upper corner bracket having an elongated bearing boss formed as an integral part of the corner bracket and which presents a cam track which may be used as the swinging cam component of the door operating device;

FIG. 36 is a vertical section of the modified upper corner bracket shown in FIG. 35 as the same would appear when the hinge pintle has been inserted into the bearing boss and the projecting end of the hinge pintle has been attached to the hinging arm of a pilaster supported hinge bracket; and FIG. 37 is a horizontal section of the modified corner brackets shown in FIGS. 34 and 36 and the hinge pintle associated therewith as the same would appear when secured to the corner notch cut-out in the door body and viewed along line 37—37 of FIGS. 34 and 36.

Similar reference characters refer to similar parts throughout the several views of the drawings and specification.

The door structures and hinge bracket assemblies of this invention may be made in various forms, may be swingably mounted on the fixed hinging arms of various types of hinge brackets fixed to posts and pilasters which may be either floor supported or ceiling suspended. To exemplify the various forms of door structures and door bracket assemblies which may be made in accordance with this invention, FIG. 1 illustrates a door structure A having an angular shaped lower corner bracket B fitted within a notch cut-out formed in the lower rear corner of the door body, and which has a door operating device F associated therewith. The door structure A shown in FIG. 1 has an upper S-shaped door bracket C presenting a U-shaped saddle part 30 set within a U-shaped notch cut-out formed in the rear edge of the door body, and which supports a simple hinge pintle 70 in alignment with the elongated hinge pintle 50 of the door operating device associated with the lower corner bracket B.

As a further exemplification, FIG. 2 shows a door structure A' having a lower rear corner bracket B attached to the lower rear corner of the door body, and whose bearing boss is designed to receive a hinge pintle 71 fixed to the hinging arm of a pilaster supported bracket. A somewhat similar upper corner bracket D is interfitted with a notch cut-out in the upper rear corner of the door body, and whose bearing boss has the door operating device F associated therewith. As a further exemplification, the door structure A″ shown in FIG. 3, has an angular shaped lower corner bracket B interfitted with a notch cut-out in the lower rear corner of the door body, and whose bearing boss has the door operating device F associated therewith. A somewhat similar angular shaped upper corner bracket D is interfitted with an upper corner cut-out of the door body, and whose journaling boss is design to receive an upper pivot pintle 71.

It will thus be appreciated, that the door operating device F may be associated with the angular shaped lower door bracket B as shown in FIGS. 1 and 3, or the angular shaped upper door bracket D as shown in FIG. 2; or a door operating device F may be associated with both the lower door bracket B and the upper door bracket D. The provision of a pair of door operating devices associated with both the lower and upper corner brackets B and D may in some cases be found useable, as when the door structure is particularly heavy, or where a strong impelling force is desired to automatically swing the door from manually opened position to a predetermined residence position.

Each of the door structures A, A′ and A″ is preferably provided with a latch assembly E whose body section is inset into a pocket formed in the front vertical edge of the door body, and whose draw bolt is positioned to be retractably inserted into a locking hole provided in the adjacent vertical edge of the latching post or pilaster. These door structures and associated pintle receiving door brackets are particularly designed to present substantially flush side wall and contoured edge surfaces, substantially free from dirt collecting crevices and projections.

The paired hinging and latching posts or pilasters P and P′ between which the door structure is swingably mounted, may be variously formed and constructed, and may be either floor supported or ceiling hung. The paired door supporting and latching pilasters P and P′ are preferably formed to present substantially flush side wall surfaces and edge surfaces, and preferably have a thickness which is equal to or only slightly greater than the thickness of the door structure positioned therebetween. The paired pilasters P and P′ may be generally similar in appearance and each pilaster is preferably constructed from a pair of metal or plastic facing sheets presenting spaced side panel sections 100 terminating in a pair of inturned edge forming flanges 101 along the exposed vertical and horizontal edge thereof, as shown in FIG. 4. The paired inturned flanges 101 present outturned lip sections 102 which are spot welded together, after a sound deadening and reinforcing core 103 has been sandwiched between the spaced facing panel sections 100. The exposed vertical and horizontal edges of the pilaster body are preferably trimmed by semi-tubular edge trimming strips 104 which are telescoped over and interlocked with the paired lip sections 102.

The paired floor supported pilasters P and P′ as shown in FIGS. 1 and 3 are rigidly secured by suitable brackets and lag screws (not shown) to the building floor, and concealed within a trimming shoe 105, which is shaped to vertically telescope over the pilaster and snugly seat against the building floor. The paired ceiling hung pilasters P and P′ as shown in FIG. 2, have the upper ends thereof secured by suitable brackets and lag screws (not shown) to the building ceiling, and concealed within a similar trimming shoe 105 which telescopes over the associated pilaster and snugly seats against the ceiling surface. The upper ends of the paired floor supported pilasters P and P′ shown in FIG. 1, are substantially flush with the upper end of the door structure mounted therebetween, and the lower end of the paired ceiling hung pilasters P and P′ as shown in FIG. 2 are likewise substantially flush with the lower horizontal edge of the door structure mounted therebetween. In cases where it is desired to provide further bracing support for the paired floor supported pilasters P and P′ as shown in FIG. 3, the paired pilasters may extend above the upper horizontal edge of the door structured mounted therebetween, and the extended upper ends of the pilaster secured to a horizontally bracing strut or beam forming member 106.

The paired pilasters P and P′ are further braced by dividing partitions 107 as shown in FIG. 5 which extend between and are secured to the vertical building wall and the pilasters P and P′. The building wall, the transverse dividing partitions 107, the door supporting and latching pilasters P and P′ and the door structures swingably mounted therebetween, together form the enclosing cubicles.

The door structures A, A′ and A″ are swingably supported by a pair of suitable hinge brackets which are rigidly secured to the hinging edge of the door supporting pilaster P, and are preferably formed as disclosed in my prior patent 2,876,874, granted March 10, 1959. When thus formed, each hinge bracket preferably is rigidly secured to the hinging edge of the door supporting pilaster P during manufacture thereof, and prior to attachment of the pilaster to the building floor or building ceiling. Where the pilaster supported hinge brackets are already rigidly fixed in spaced position before the door structure is hung thereon, the door brackets B, C and D, the hinge pintles and associated door structures A, A′ and A″ are so formed as to snugly interfit with the projecting arms 110 of the fixed pilaster supported hinge brackets.

Where the door supporting pilaster P extends both above and below the hinging arm 110 of the hinge arm 110 of the hinge bracket, as shown in FIGS. 1 and 3 and the upper part of FIG. 2, a hinging bracket 111 may be provided which has a pair of vertically aligned body sections 111′ extending both above and below its hinging arm 110, and rigidly interlocked with the adjacent vertically extending semi-tubular edge trimming strips 104 of the pilaster. Where the pilaster supported hinge bracket is to be attached to the terminal end of the hinging pilaster, as shown in the lower part of FIG. 2, an angular shaped hinging bracket 112 is attached to the adjacent corner of the supporting pilaster by means of a vertically extending body section which interlocks with the vertically extending semi-tubular edge trimming strip 104 of the pilaster, and a horizontally extending body section which interlocks with the adjacent semi-tubular edge trimming strip 104 extending along the horizontal edge of the pilaster. The hinging arms 110 of all of the hinging brackets 111 and 112 are designed to interfit with the swinging door brackets B, C and D and are connected thereto by the hinge pintles.

*The Door Structures*

Each of the door structures A, A′ and A″ as shown in FIGS. 1, 2 and 3 comprises a door body preferably formed from a pair of metallic or plastic panel facing sheets which are die cut and then shaped in a press into a pair of similar complementary facing pans 1. Each facing plan as shown in FIG. 4, presents a panel facing section 1′ having inturned flange sections 2 which terminate in outwardly flared lip sections 3, except at those areas where the door latch assembly E, lower corner bracket B, and upper corner bracket C or D are applied to the door body. A suitable insulating core or filler 4 is sandwiched between the facing pans as shown in FIG. 4 and adhesively bonded to the inner surfaces thereof. The paired and outwardly flared lip sections 3 as presented by the complementary facing pans 1 extend along the front vertical edge, the top and bottom horizonal edges and the rear vertical edge of the door body of all three types of door structures A, A′ and A″, and are secured together by spot welds 3′ externally applied between the paired lip sections 3 to thereby provide a rigid door body.

Semi-tubular edge trimming strips 5 are telescopically applied in proper sequential order to the paired outwardly flared lip sections 3 of each door body during application of the latch assembly E, the upper corner bracket C or D and the lower corner bracket B, as hereafter more fully explained. Each semi-tubular edging strip 5 as shown in FIGS. 6 and 9, presents a facing portion 5' which may be attractively contoured to an arcuate shape, and from which a pair of inturned lip portions 5'' extends. The paired lip portions 5'' are designed to seat against the adjacent flange sections 2 of the door body and interlock with the paired outwardly flared lip sections 3 thereof.

The complementary facing pans 1 which form the door bodies for the door structures A, A' and A'' are provided with a lower corner cut-out 6 as shown in FIG. 6 designed to receive the lower corner bracket B as shown in FIGS. 7 and 8. The lower corner cut-out 6 is defined by depressed ledge portions 7 of L-shaped form which terminate in a pair of depressed flange portions 8 which extend generally parallel to but are inset with respect to the facing panel sections 1' of the facing pans 1. The outwardly flared lip sections 3d which extend along the rear vertical edge of each door body, terminate short of the notched cut-out 6, and are replaced by paired rib portions 9 which extend laterally and substantially at right angles to the adjacent flange sections 2 of the door body as shown in FIG. 6. When the complementary facing pans 1 of the door body have been secured together in integral assembly, the paired rib portions 9 together provide a laterally projecting rib designed to extend into and interlock with a corresponding groove 28''' formed along the inside face of the vertically extending leg 28 of the lower corner bracket B. The depressed ledge portions 7 are designed to provide a receiving pocket for the flush reception of the rim forming flanges 24 of the lower corner bracket B when mounted on the door body as hereafter explained.

The outwardly flared lip sections 3e sections which extend along the lower horizontal edge of the door body of each of the door structures A, A' and A'', terminate at the notch cut-out 6; but the inturned flange sections 2 extending along the lower horizontal edge of the door body present end extensions 2' which project into the cut-out 6 as shown in FIG. 6. The end extensions 2' provide a means for securing the saddle section 22 of the lower corner bracket B to the lower horizontal edge of the door body, as hereafter more fully explained. The bottom flange extensions 2' extend between the depressed flange portions 8 and may be secured together by suitable spot welds to provide a rigid end extension as shown in FIGS. 6 and 17.

The door structure A as shown in FIG. 1 presents a door body having a notch cut-out 10 in the rear edge thereof and adjacent to the upper horizontal edge thereof, and which is designed to receive the U-shaped saddle section 30 of an S-shaped upper corner bracket C as shown more particularly in FIG. 9 and FIGS. 11–14. The notch cut-out 10 extends into the complementary facing panel sections 1' and is rimmed by a pair of inset ledge portions 11 which terminate in paired flange portions 12. The paired flange portions 12 are inset with respect to the facing panel sections 1', and extend around the U-shaped cut-out 10. The paired inset ledge portions 11 provide paired pockets which snugly receive the rim forming flange 33 of the U-shaped saddle part 30 of the S-shaped upper corner bracket C as hereafter more fully explained.

The outwardly flared lip sections 3c which extend along the upper horizontal edge of the door body of the door structure A, terminate short of the upper rear corner of the door body and are replaced by a pair of upwardly projecting rib portions 13 which project laterally substantially at right angles from the flange sections 2 with which they are integrally formed, as shown in FIGS. 12 and 13. A pair of similar and vertically extending rib portions 13' projecting laterally at right angles from the vertical flange sections 2 and extend from the upper rear corner of the door body to the notch cut-out 10, as shown in FIG. 12. The paired lip sections 3d which extend along the rear vertical edge of the door body as shown in FIG. 9, terminate short of the notch cut-out 10 and are also replaced by a pair of relatively short rib portions 13'' which extend from the upper terminus of the lip sections 3d to the notch cut-out 10 as indicated in FIG. 12. The three sets of paired rib portions 13, 13' and 13'' provide auxiliary means for rigidly securing the edge trimming legs 35, 36 and 37 respectively of the S-shaped upper corner bracket C to the door body of the door structure A as shown in FIGS. 1 and 9 and hereafter further described.

The door bodies for the modified door structures A' and A'' as shown in FIGS. 2, 3 and 27, are each provided with an upper corner cut-out 15 as shown in FIG. 29 which is designed to receive and provide mounting support for the angular shaped upper corner bracket D as shown in FIG. 28. The upper corner cut-out 15 is defined by depressed ledge portions 16 of L-shaped form which terminate in a pair of depressed flange portions 17 which extend generally parallel to but are inset with respect to the facing panel sections 1' of the door body. The outwardly flared lip sections 3c which extend along the upper horizontal edge of the door body terminate short of the notch cut-out 15 and are replaced by a pair of horizontally extending rib portions 18 which extend upwardly and substantially at right angles to the adjacent horizontal flange sections 2 as shown in FIG. 29, and which are designed to interlock with the saddle section 42 of the upper corner bracket D. The inturned flange sections 2 extending along the upper horizontal edge of the door body present end extensions 2'' which project into the cut-out 15 as shown in FIG. 29 and provide an auxiliary seat for the saddle section 42 of the angular shaped upper corner bracket D. The paired outwardly flared lip sections 3d which extend along the rear vertical edge of the door body terminate short of the upper corner cut-out 15 as shown in FIG. 29, and are replaced by a pair of rearwardly projecting and vertically extending rib portions 18' as shown in FIGS. 29 and 32, and which provide auxiliary means for securing the downwardly extending leg 48 of the angular shaped upper corner bracket D to the door body of the door structures A' and A'' as hereafter further explained.

Each of the door structures A, A' and A'' preferably incorporates a latch assembly E which includes a body section e1 which is inserted through a conforming hole cut in the inturned flange sections 2 extending along the front edge of the door body. The latch assembly E, whose body section e1 is concealed within the door body as indicated by phantom lines in FIGS. 1, 2 and 3, presents escutcheon plates e2 of circular form which are journaled in depressions formed in the facing panel sections 1' of the door body, with the exposed faces of the circular escutcheon plates e2 substantially flush with the outer surfaces of the facing panel sections 1'. One or both circular escutcheon plates e2 may be provided with a handle formation e3 for manipulating the latch bolt.

The outwardly flared lip sections extending along the front edge of the door body, terminate short of the latch body receiving hole, to accommodate therebetween the edge face plate e4 of the latch assembly E. The face plate e4 seats against the rim portions surrounding the latch case receiving hole in the door body flange sections 2, and presents a tongue portion e5 extending from each end of the facing plate e4. The tongue portions e5 are designed to telescope into the terminal ends of the adjacent door body edging strips 5a and 5b, which extend above and below the face plate e4.

The door structures A, A' and A'', as thus formed, present paired upper and lower lip sections which extend along the front vertical edge of the door body from the face plate e4 of the latch assembly E to the upper and lower front corners of the door body, and to which the upper and lower edge trimming strips 5a and 5b are telescopically applied. The door structures A, A' and A" also present a pair of outwardly flared lip sections 3c which extend from the upper front corner to a point short of the upper rear corner of the door body, and to which the upper horizontally extending edging strip 5c is telescopically applied. The door structures A, A' and A" also present a pair of outwardly flared lip sections 3d extending along the rear vertical edge of the door body from a point short of the lower rear corner cut-out 6 as shown in FIG. 6, to a point short of the U-shaped notch cut-out 10 as shown in FIG. 9, or to a point short of the upper corner cut-out 15 as shown in FIG. 29, and to which the rear vertical edging strip 5d is telescopically applied. The door structures A, A' and A" also present a pair of outwardly flared lip sections 3e extending along the lower horizontal edge of the door body from the lower front corner to a point adjacent the lower rear corner cut-out 6 thereof as shown in FIG. 6, and to which the lower horizontal edging strip 5e is telescopically applied. The front edging strips 5a and 5b, the upper and lower horizontal edging strips 5c and 5e, and the rear edging strip 5d, are applied to the door body in sequential order as the latch assembly E, the upper corner brackets C or D and the lower corner bracket B are consecutively applied to the door body.

*The Door Brackets*

The lower door bracket B as shown in FIGS. 7 and 8 is designed for application to the lower corner cutout 6 common to all the door bodies of the door structures A, A' and A" shown in FIGS. 1, 2 and 3. The lower corner bracket B may be integrally cast or molded from suitable metal or a tough plastic compound, and is designed to support the weight of the door structure when swingably mounted on a hinge pintle 50 or 71 fixed to the projecting arm 110 of a pilaster supported hinge bracket. The lower corner bracket B is generally angular in form, and presents a horizontal arm 20 extending into the corner cut-out 6 of the door body, and an edge trimming leg 28 extending vertically therefrom as shown in FIG. 9.

The horizontally extending arm 20 presents a base section 21 connected to a depressed saddle section 22 by a vertically extending hip wall 23. The base section 21, hip wall 23 and saddle section 22 are rimmed by a pair of spaced rim forming flanges 24 of generally L-shaped form, and which are designed to interfit with the depressed ledge portions 7 formed in the facing pans 1 of the door body, and with the perimetrical edge 24' of the L-shaped rim forming flanges 24 forming substantially flush and thin line joints with the adjacent facing panel sections 1' of the door body as shown in FIGS. 9 and 10 and FIGS. 15–17.

The saddle section 22 of the lower corner bracket B presents a generally arcuate underface 22' which snugly overlaps the arcuate facing portion 5' of the lower horizontal edging strip 5E which projects into the saddle section 22. The saddle section 22 also receives the end extensions 2' of the inturned flange sections 2 extending along the lower edge of the door body of each of the door structures A, A' and A" as shown in FIGS. 6 and 17. Aligned screw holes 27 extend through the arcuate underface of the saddle section 22, the adjacent end portion of the edge trimming strip 5e and the end extensions 2', and through which a securing screw 27' having an inset head may be inserted and threadably secured in a threaded hole formed in the end extensions 2'; or alternatively threaded into a Tinnerman nut applied to the end extensions 2'. As thus assembled, only a relatively thin free edge of the underface wall 22' of the saddle section 22 overlaps the contoured outer face portion 5' of the horizontally extending edge trimming strip 5e, and which edge is relatively invisible when the door structure is mounted in hung position. The exposed outerface 23' of the hip wall 23 is generally arcuate in form to permit free swinging movement of the door structure as mounted on the hinge supporting arm 110 of the adjacent pilaster supported hinge bracket.

The edge trimming leg 28 of the lower corner bracket B extends vertically from the horizontal base section 21 thereof, and presents an attractively contoured outer face 28' which tapers smoothly into the adjacent outer faces of the rim forming flanges 24. The upper end of the edge trimming leg 28 has an outer face contour 28' which corresponds to the contoured outer face 5' of the adjacent vertically extending edge trimming strip 5d when the door structure is fully assembled. The upper end of the edge trimming leg 28 terminates in an upwardly projecting tongue portion 29 whose base is of lesser cross-section than the adjacent end of the edge trimming leg 28 from which it extends to present inner and outer abutment shoulders 29'. The tongue portion 29 is designed to telescope into the adjacent end of the semi-channel shaped edge trimming strip 5d, with the terminal end of the edge trimming strip 5d in snug abutting relation to the inner and outer shoulders 29' at the base end of the tongue portion 29.

The flat inner face 28" of the edge trimming leg 28 flatly seats against the adjacent vertically extending inturned flange sections 2 of the door body. A vertically extending groove 28''' is formed in the inner face 28" of the edge trimming leg 28 and the rear face of the tongue portion 29 projecting therefrom, and which is designed to receive the paired rib portions 9 projecting rearwardly from the adjacent vertical flange sections 2 of the door body. An internal abutment, which may comprise one or more abutment lugs 28a, as shown in FIGS. 8 and 17, project from the inside face of the base section 21 of the lower corner bracket B, and are spaced a sufficient distance from the flat inner face 28" of the edge trimming leg 28 to snugly receive the adjacent terminal end portions 2''' of the vertical flange sections 2 of the door body therebetween as shown in FIG. 17.

The S-shaped upper corner bracket C is applied to the door body of the door structure A as shown in FIGS. 9–14. The S-shaped corner bracket C may be integrally cast or molded from metal or tough plastic and presents a U-shaped saddle part 30 designed to interfit within the U-shaped cut-out 10 of the door body. An edge trimming leg 37 extends downwardly from the lower arm of the U-shaped saddle part 30, an edge trimming leg 36 extends upwardly from the upper arm of the saddle part 30, and a horizontal edge trimming leg 35 projects laterally from the upper end of the upwardly extending edge trimming leg 36 in a direction substantially parallel to the horizontal arms of the saddle part 30.

The upper and lower horizontal arms of the saddle part 30 present parallel extending web sections 31 having flat inner faces 31', and are joined by a vertically extending web section 32 having a rounded inner face 32'. The inner faces 31' of the upper and lower web sections 31 are spaced apart a sufficient distance to provide a pocket which receives the hinging arm 110 of the adjacent pilaster attached hinging bracket, as shown in FIG. 1. The horizontal web sections 31 and the vertical web section 32 are rimmed by a pair of continuous rim forming flanges 33 designed to be snugly pocketed within the inset ledge portions 11 of the notch cut-out 10, with the perimetrical edges 33' of the rim forming flanges 33 smoothly interfitting with the adjacent inset ledge portions 11 to provide a fine line joint therebetween as shown in FIG. 9, and with the outer faces of the rim forming flanges 33 substantially flush with the outer faces of the surrounding facing panel sections 1' of the door body. Block portions 34, formed integral with the upper and lower horizontal web sections 31 and the vertical web section 32 of the U-shaped saddle part 30 extend between but are spaced from the adjacent inside faces of the rim forming flanges 33 to provide paired grooves 34' therebetween into which the paired flange portions 12 of the door body are designed to project, as shown in FIGS. 11 and 14.

The downwardly extending edge trimming leg 37 has an attractively contoured outer face 37' which is tapered to merge into the outer faces of the adjacent horizontal portions of the rim forming flanges 33, and the lower end thereof is contracted in area so that its arcuate outer face 37' is in size and shape conformity to the arcuate facing portion 5' of the vertical edging strip 5d as shown in FIG. 9. The upwardly extending edge trimming leg 36 also presents a similar attractively contoured outer face 36' whose lower end merges into the side faces of the adjacent horizontal portions of the rim forming flanges 33, and whose upper end is contracted in cross-section to conform to the size and contour of the semi-tubular edge trimming strips 5. The horizontally extending edge trimming leg 35 extends inwardly from the upper end of the upwardly extending edge trimming leg 36, has a contoured outer face 35' which merges smoothly at a right angle into the contoured outer face 36' of the upwardly extending edge trimming leg 36.

A tongue portion 38 extends from the terminal end of the downwardly extending edge trimming leg 37 and from the terminal end of the horizontal edge trimming leg 35, and is designed to telescope into the adjacent end of the respective semi-tubular edge trimming strips 5d and 5c. The base of each tongue portion 38 is of less cross-sectional area than the adjacent end of the edge trimming legs 37 and 35 of which it forms a part, to provide inset inner and outer shoulders 38' against which the adjacent ends of the edge trimming strips 5d and 5c abut to provide a smooth and flush line joint therebetween.

The downwardly extending edge trimming leg 37, the upwardly extending edge trimming leg 36, and the horizontally extending edge trimming leg 35, each presents a flat inner face 39, designed to snugly seat against the outer faces of the adjacent inturned flange sections 2 of the door body as shown in FIGS. 9, 11 and 12. A longitudinally extending groove 39' is formed in the inner faces 39 of the edge trimming legs 35, 36 and 37, and also in the inner faces of the tongue portions 38, for the reception of the adjacent paired rib portions 13, 13' and 13" projecting from the flange sections 2 of the door body, as shown in FIGS. 12 and 13.

The horizontal edge trimming leg 35, and the upper and lower web sections 31 of the U-shaped saddle part 30 of the S-shaped bracket C, are provided with aligned holes 39a extending therethrough for the reception of a hinge pintle 70, which is applied when the door is mounted. The hinge pintle 70 is provided with a cylindrical shank section 70a whose terminal end extends through or partly through the lower web section 31 of the saddle part 30 as shown in FIG. 11. That portion of the pintle shank 70a extending between the upper and lower web sections 31 of the S-shaped corner bracket C, is designed to be journaled in a hole formed in the hinging arm 110 of the adjacent pilaster supported hinge bracket 111. The upper end portion 70b of the upper hinge pintle 70 is provided with knurling designed to grip the inner perimeter of the hinge pintle receiving hole 39a formed in the horizontal edge trimming leg 35, and thus hold the hinge pintle 70 against rotation. When placed in operative position, the upper end of the hinge pintle 70 is substantially flush with the outer contoured face 35' of the horizontal edge trimming leg 35 as shown in FIG. 11. The upper end of the hinge pintle 70 may be provided with a threaded socket 70c to which a threaded tool may be applied to facilitate withdrawal of the hinge pintle 70.

The upper corner bracket D as shown in FIGS. 27 and 28, is designed for application to the upper corner cut-out 15 common to the door bodies of the door structures A' and A" as shown in FIGS. 2 and 3. The upper corner bracket D may be integrally cast or molded from suitable metal or a tough plastic compound, and is designed to receive a hinge pintle fixed to the projecting arm 110 of the pilaster supported hinge bracket. The upper corner bracket D is generally angular in form, may be generally similar to the lower corner bracket B, and presents a horizontal arm 40 extending into the notch cut-out 15 of the door body, and an edge trimming leg 48 extending downwardly therefrom as shown in FIGS. 27 and 28.

The horizontally extending arm 40 presents a base section 41 connected to a raised saddle section 42 by a vertically extending hip wall 43. The base section 41, hip wall 43 and saddle section 42 are rimmed by a pair of spaced rim forming flanges 44 of generally L-shaped form, and which are designed to interfit with the depressed ledge portions 16 formed in the facing pans 1 of the door body, and with the perimetrical edges 44' of the L-shaped rim forming flanges 44 providing substantially flush and thin line joints with the adjacent facing panel sections 1' of the door body as shown in FIG. 27.

The saddle section 42 of the upper corner bracket D presents a generally arcuate outerface 42' and a flat innerface 42" which snugly overlaps the flange sections 2 and end extension 2" of the door body which project into the saddle section 42. The saddle section 42 may have a tongue portion 47 extending from the end thereof which is designed to project into the adjacent end of the semi-tubular edging strip 5c extending along the top horizontal edge of the door body. The base end of the tongue portion 47 presents inset inner and outer shoulders 47' against which the adjacent end of the edge trimming strip 5c snugly abuts. The innerface 42" of the saddle section 42 and the innerface of the tongue portion 47 extending therefrom is provided with a longitudinally extending groove 42''' which receives the horizontal rib portions 18 extending from the door body as shown in FIGS. 28 and 29. Aligned screw receiving holes 42a may be provided in the saddle section 42 and end extensions 2" of the door body through which a securing screw having an inset head may be inserted and threadably secured to the end extensions 2", or to a Tinnerman nut applied to the end extensions 2". As thus assembled, the adjacent end of the horizontal edge trimming strip 5c presents a substantially flush and single line joint with the arcuate outerface 42' of the saddle section 42. The exposed outerface 43' of the hip wall 43 is generally arcuate in form to permit free swinging movement of the door structure as mounted on the hinge supporting arm 110 of the adjacent pilaster supported hinge bracket.

The edge trimming leg 48 of the upper corner bracket D extends vertically downward from the horizontal base section 41 thereof, and presents an attractively contoured outer face 48' which tapers smoothly into the adjacent outer faces of the rim forming flanges 44. The lower end of the edge trimming leg 44 has an outerface contour 48' which corresponds to the contoured outerface 5' of the adjacent vertically extending edge trimming strip 5d when the door structure A' or A" is fully assembled. The lower end of the edge trimming leg 48 terminates in a downwardly projecting tongue portion 49 whose base is of lesser cross-section than the adjacent end of the edge trimming leg 48 from which it extends to present inner and outer abutment shoulders 49'. The tongue portion 49 is designed to telescope into the adjacent end of the semi-channel shaped edge trimming strip 5d, with the terminal end of the edge trimming strip 5d in snug abutting relation to the shoulders 49' at the base end of the tongue portion 49.

The flat inner face 48" of the edge trimming leg 48 flat seats against the adjacent inturned flange sections 2 of the door body. A vertically extending groove 48''' is formed in the inner face 48" of the edge trimming leg 48 and the inner face of the tongue portion 49 projecting therefrom as shown in FIG. 28, and which is designed to receive the paired rib portions 18' projecting rearwardly from the adjacent vertical flange sections 2 of the door body. An internal abutment, which may be provided by one or more abutment lugs 48a as shown in FIGS. 28 and 30, project from the inside face of the base section 41 of the upper corner bracket D, and are spaced a sufficient distance from the flat inner face 48″ of the edge trimming leg 48 to snugly receive therebetween the adjacent terminal ends 2‴ of the vertical flange sections 2 of the door body.

The inner face of the base section 21 of the angular shaped lower corner bracket B, and the inner face of the base section 41 of the upper angular shaped corner bracket D present a bearing boss fixed thereto which extends into the door body. The bearing boss has a bearing bore which receives the cylindrical shank section of the hinge pintle, and on which the corner bracket is swingably journaled. The bearing boss may be formed in two rigidly attachable sections, or the entire bearing boss may be formed as an integral part of the corner brackets B and D.

Where the bearing boss is formed in two sections, one of the sections may be made in the form of a block portion 25 which is integral with the inner face of the base sections 21 and 41 of the lower and upper corner brackets B and D, as shown in FIGS. 8 and 28, and whose side faces are spaced from the inside faces of the adjacent rim forming flanges 24 and 44 of the respective corner brackets B and D to provide grooves 25′ therebetween into which the respective inset flange portions 8 formed in the lower rear corner of the door body, and the inset flange portions 17 formed in the upper corner of the door body may be respectively pocketed as shown in FIGS. 15 and 17 and FIG. 31. A pintle receiving hole 26 extends through the block portion 25 and emerges into a large bearing receiving pocket 26′ formed in the otherwise flat outer face 21′ and 41′ of the base sections 21 and 41 of the respective corner brackets B and D. Each block portion 25 presents means for rigidly securing a companion bearing block section thereto and which together provide an elongated bearing boss for the hinge pintle. The securing means may be provided by forming four equally spaced and radially extending slots 25″ in the block portion 25 as shown in FIGS. 8 and 28, which are designed to receive and interlock with corresponding cross ribs formed in the end of the companion bearing block section.

The lower corner bracket B and the upper corner bracket D may both have a door operating device F associated therewith, and the companion bearing boss section attached to the block portion 25 is made in the form of a swinging cam member 55 formed as shown in FIGS. 19 and 30 and hereafter more fully described.

The journaling boss may also be formed as an integral part of the angular shaped lower corner bracket as shown in FIGS. 33–34, and/or as an integral part of the angular shaped upper corner bracket D as shown in FIGS. 35–36. In this modification, the journaling boss 45 may be formed to present a generally rectangular shaped block portion 45a projecting from and formed integral with the base secions 21 and 41 of the corner brackets B and D, and which may have a height which is slightly less than the height of the rim forming flanges 24 and 44 of the brackets B and D. The side faces of each block portion 45a is spaced from the inside faces of the adjacent rim forming flanges 24 and 44 of the respective corner brackets B and D to provide grooves 25′ therebetween, in which the respective inset flange portions 8 formed in the lower corner of the door body, and the inset flange portions 17 formed in the upper corner of the door body, may be respectively pocketed as shown in FIG. 37.

An auxiliary boss section 45b is integrally formed with and projects from the block portion 45a of the boss 45, and may present a cylindrical body wall 56 whose diameter is substantially equal to the transverse width of the block portion 45a. A bearing hole 26 extends axially through the auxiliary boss section 45b, block portion 45a and base section 21 and 41 of the respective corner brackets B and D, and which bearing hole is of substantial length and designed to receive the cylindrical shank section of the hinge pintle.

Where the entire corner brackets B and D and their integral journaling bosses 45 are integrally molded in one piece from a tough and wear-resistant resin compound having a low coefficient of surface friction, the axial bearing bore 26 may be precisely molded or machined to provide a snug fitting and substantially frictionless journal for the cylindrical shank section of the hinge pintle. However, where the corner brackets B and D and their associated journaling bosses 45 are integrally cast in metal, it may be desirable to provide their bearing holes 26 with a tubular liner sleeve insert 46, as shown in FIGS. 34 and 36, which may be formed from a tough and wear resistant resin compound having a low coefficient of surface friction. The tubular liner sleeve 46, as snugly fitted within the pintle receiving hole 26 of the bearing boss 45, presents a smooth bearing bore which provides a substantially frictionless journal for the cylindrical shank section of the hinge pintle. The tubular sleeve 46 may be provided with a laterally extending end flange 46′ designed to be snugly fitted within the bearing pocket formed in the outer face of the base section 21 and 41 of the corner brackets B and D, as shown in FIGS. 34 and 36.

The block portion 45a of the journaling boss 45 may also present abutment means in the form of a projecting abutment wall 45c, as shown in FIGS. 33–37, which is spaced from the inner face 28″ and 48″ of the adjacent edge trimming leg 28 and 48 of the brackets B and D, to provide a groove therebetween into which the adjacent terminal end 2‴ of the vertically extending flange sections 2 of the door body are designed to snugly telescope as shown in FIG. 37. The abutment wall 45c projects for some distance beyond the adjacent face of the block portion 45a to provide substantial abutting engagement with the inner faces of the flange sections 2 of the door body. The inner face of the abutment wall 45c is also preferably spaced from the adjacent cylindrical surface of the auxiliary boss section 45b to provide a spacing groove therebetween as shown in FIGS. 34 and 36.

The bearing boss 45 formed as an integral part of the corner brackets B and D, is preferably of substantial length to provide a bearing hole for the hinge pintle of corresponding substantial length, and to thereby provide bracing support for the cylindrical shank section of the hinge pintle to prevent bending thereof when substantial exterior strains are imposed on the mounted door structure. The smooth bearing hole 26 extending through the bearing boss 45 when molded from a tough resin compound provides in itself a smooth and substantially frictionless bearing journal for the cylindrical shank section of the hinge pintle. When the bearing boss 45 is made of metal, the tubular liner sleeve insert 46 provides a snug fitting and substantially frictionless bearing journal for the cylindrical shank section of the hinge pintle.

The integral bearing boss 45 is designed to receive the cylindrical shank section 50′ of an elongated hinge pintle 50, which forms a part of the door operating device F, and the outer end of the cylindrical body section 45b of the bearing boss 45 may be machined to provide an inclined cam track 57, and the integral bearing boss 45 then also serves as the swinging cam member of the door operating device F as hereafter described.

The Door Operating Device

The door operating device F of this invention is assembled as a unit with either the lower corner bracket B as shown in FIGS. 1 and 3, or the upper corner bracket D as shown in FIG. 2, after which the corner bracket and door operating device is applied as a unit to the door body and held in position by the means used to secure the corner bracket to the door body. Since the door operating device F operates through the corner bracket, and not by contact with the interior faces of the facing panel sections 1′ of the door body, the door operating devices F of this invention may all be made similar in form and size to accommodate door bodies of varying thickness.

The door operating device F, as shown in FIGS. 9, 15–26 and FIGS. 27, 30 and 31, comprises an elongated hinge pintle 50 having a cylindrical shank section 50' and a polygonal shank section 50" extending therefrom. The opposite end of the cylindrical shank section 50' is designed to extend through the pintle receiving hole of the lower corner bracket B or the pintle receiving hole of the upper corner bracket D, and terminates in a tapered neck section 51 designed to extend through a tapered hole 110' in the hinging arm 110 of the pilaster supported hinge bracket. The tapered neck section 51 terminates in a threaded end portion 51' to which a lock nut 52 is applied, and which is designed to seat within a conforming pocket 110''' provided in the outer face of a hinging arm 110 of the pilaster supported hinge bracket as shown in FIG. 19. The tapered neck section 51 is preferably surfaced with longitudinally extending ribs or knurling designed to grip the tapered interior face of the tapered bore 110' in the hinging arm 110 so that when the lock nut 52 is applied and tightened, the elongated hinge pintle 50 is rigidly secured against rotation to the hinging arm 110.

Where the elongated hinge pintle 50 is associated with the lower corner bracket B designed to support the weight of the door, a thrust bearing 53 is seated within the bearing receiving pocket 26' formed in the flat underface 21' of the hinge bracket, and can be advantageously retained in position by means of a retainer ring 54 whose inner rim is clamped into a circumferential groove 54' adjacent the tapered neck section 51 of the hinge pintle 50. The thrust bearing 53 may comprise a ball bearing assembly, or may comprise a pair of flat faced wear resistant washers 53a and 53b as shown in FIGS. 15 and 19, which may be made of nylon or like tough and wear-resistant plastic having a low coefficient of surface friction, and adapted to support the lower corner bracket B and the weight of the door body and permit swinging movement of the door structure with minimum friction. The outer bearing washer 53b may be provided with a downwardly depending skirt as shown in FIG. 19 within which the retainer ring 54, as clamped to the circumferential groove 54', is pocketed. Where the hinge pintle 50 is associated with the upper corner bracket D, only a single frictionless washer 53b need be inset within the bearing receiving pocket 26' and held in position by the adjacent retainer ring 54 as shown in FIG. 30.

In addition to the elongated hinge pintle 50, the door operating device F includes a swingable or rotatable cam track 57, which may be formed in the free end of the cylindrical body section 45b of the integral journaling boss 45 as shown in FIGS. 33–36, or may be presented by the free end of a separate cam member 55 designed to be rigidly secured to the block portion 25 of the corner brackets B and D. The swingable cam member 55, as shown in FIGS. 19 and 20, on which a riding cam member 60 may be journaled, presents a cylindrical outer wall 56 and its base end is provided with a series of radially extending lugs 58 shaped to be snugly driven into the radiating slots 25" formed in the block portion 25 of the angular shaped lower corner bracket shown in FIG. 8, or the angular shaped upper corner bracket D shown in FIG. 28. As shown in FIGS. 20A and 20B, the swingable cam member 55 may also be provided with a root forming sleeve extension 56' designed to be snugly inserted in the bearing hole 26 of the block portion 25 and the base section 21 or 41 of the bracket B and D.

The swingable cam member 55 may be integrally molded from a tough and wear-resistant resin compound having a low coefficient of surface friction, and has an axial bearing bore 26a extending therethrough which provides a snugly fitted and substantially frictionless journal for the cylindrical shank section 50' of the elongated hinge pintle 50. When the journaling boss 45, cast or molded as an integral part of the corner bracket B and D as shown in FIGS. 38–42, is alternatively used in substitution for the separable swingable cam member 55, its cylindrical body section 45b may also present a smooth and truly cylindrical outer wall 56 which provides a journal for the riding cam member 60 of the door operating device F.

The free end of the cylindrical body section 45b of the integral journaling boss 45, as well as the free end of the separable cam member 55, each presents a continuous cam track 57 which is inclined with respect to the longitudinal axis of its outer cylindrical wall 56, and presents a peak portion 57a and a diametrically opposite valley portion 57b joined by inclined camming faces 57c. The swingable cam member 55 as well as the integral cam boss 45 presents a smooth journaling bore 26a which is telescoped over the cylindrical shank section 50' of the elongated hinge pintle 50 and designed to smoothly rotate thereon when the hinge pintle 50 is rigidly secured to the hinging arm 110 of the pilaster supported hinge bracket.

The riding cam member 60 of the door operating device F, preferably presents a cylindrical outer surface 60' and includes a head section 61 which has a polygonal bore 61' and a depending skirt section 62 having a cylindrical bore 62' designed to snugly telescope over the cylindrical outer wall 56 of the swinging cam member 55 or journaling boss 45. The head section 61 presents a continuous internal cam track 63 which is complementary to the cam track 57 presented by the swingable cam member 55 or journaling boss 45, and is designed to seat thereon. The internal cam track 63 of the riding cam member 60 presents a peak portion 63a and a diametrically opposite valley portion 63b joined by inclined camming faces 63c. The riding cam member 60 is telescoped over the elongated hinge pintle 50, and is so positioned that the polygonal bore 61' in its head section receives the polygonal shank section 50" of the elongated hinge pintle 50 and is thus free to telescope in a longitudinal direction along the polygonal shank section 50" of the hinge pintle 50, but is held against rotation when the hinge pintle 50 is rigidly secured to the hinging arm 110 of a pilaster supported hinge bracket. The upper end of the polygonal bore 61' of the riding cam member 60 may be provided with an inwardly extending perimetrical rim 61" which has a smooth and snug sliding fit with the polygonal shank section 50" of the hinge pintle 50 extending therethrough, to thereby reduce sliding friction.

The depending skirt section 62 of the riding cam member 60 snugly telescopes over the cylindrical outer wall 56 of the swinging cam member 55 or journaling boss 45 when the door operating device F is fully assembled to the corner bracket, and the cylindrical outer wall 56 of the swinging cam member 55 or journaling boss 45 is thus snugly journaled in the cylindrical bore 62' of the riding cam member. The riding cam member 60 may be cast or molded in one piece, and is preferably molded from a tough, strong and wear-resistant plastic such as nylon having a low coefficient of surface friction, so that the cylindrical outer wall 56 of the swinging cam member 55 or journaling boss 45 may rotate within the cylindrical bore 62' of the riding cam member 60, and so that the riding cam member 60 may longitudinally telescope over the polygonal body section 50" of the elongated hinge pintle 50, with minimum friction. In cases where the swinging cam member 55 or journaling boss 45 is made of metal, it is particularly desirable to form the riding cam member 60 from a tough, wear-resistant and substantially frictionless resin compound, such as nylon, to insure long use life and smooth camming action between the complementary cam tracks 57 and 63.

The internal cam track 63 of the vertically reciprocable riding cam member 60 is maintained at all times in pressure riding contact with the cam track 57 of the swingable cam member 55 or journaling boss 45, by the application of resilient pressure against the riding cam member 60. Resilient loading pressure may be applied to the riding cam member 60 by means of a helical compression spring 65 designed to seat against the flat end 64 of the riding cam member, and which is telescoped over that portion of the polygonal shank section 50″ of the elongated hinge pintle 50 which extends beyond the riding cam member 60, as shown in FIGS. 18 and 19. A seating washer 66 seats against the opposite outer end of the helical compression spring 65, and the spring may be maintained under compression by a retainer ring 67 which is snapped into a circumferential groove 67′ formed in the outer end of the polygonal body section 50″ of the elongated hinge pintle 50.

Since the elongated hinge pintle 50, as rigidly secured to the fixed hinging arm 110 of the pilaster attached hinge bracket, does not rotate, and since the riding cam member 60 longitudinally reciprocates but does not rotate on the polygonal body section 50″ of the elongated hinge pintle 50, the helical compression spring 65 is not subjected to rotative strains, but compressive forces only, thereby insuring long life for the helical compression spring 65, and the maintenance of a uniform loading force on the riding cam member 60 through many years of use.

The door operating device F may be quickly and expeditiously assembled as a unit in association with the angular shaped lower corner bracket B or the angular shaped upper corner bracket D prior to the attachment of corner bracket to the door body. As the initial step, the cylindrical shank section 50′ of the elongated hinge pintle 50 is telescoped into the bearing bore 26 or 26a or bearing sleeve 46 of the swingable cam member 55 or journaling boss 45, with the tapered neck section 51 thereof projecting from the base section 21 and 41 of the corner bracket B and D. In the case of the swingable cam member 55, its radial lugs 58 are snugly driven into the radial slots 25″ of the corner bracket block portion 25. A thrust bearing 53, which may comprise either a ball bearing assembly or formed by a pair of bearing discs 53a and 53b or a single bearing disc 53b, can then be telescoped over the projecting end 51 of the hinge pintle 50 and held in position by a retainer ring 54 clamped into the circumferential groove 54′ of the hinge pintle 50. The riding cam member 60 may then be telescoped over the polygonal shank section 50″ of the hinge pintle 50, with its inner camming track 63 brought into camming engagement with the continuous cam track 57 of the swingable cam member 50 or journaling boss 45, and with the skirt section 63 of the riding can member 60 snugly journaled on the cylindrical wall 56 thereof. The helical compression spring 65 may then be telescoped over that portion of the polygonal shank section 50″ of the hinge pintle 56 which extends beyond the end face 64 of the riding cam member 60, and with the adjacent end of the helical compression spring 65 brought into seating engagement therewith. The seating washer 66 can then be telescoped over the end of the hinge pintle 50, pressed against the outer end of the helical compression spring 65, and so held by clamping the retainer ring 67 to the circumferential groove 67′ of the hinge pintle.

The lower angle shaped corner bracket B or the upper angular shaped corner bracket D, having the door operating device F attached thereto, may then be applied to the lower rear corner of the door structure A or A″ or to the upper rear corner of the door structure A′. An unobstructed pocket 4′ of the proper dimensions, formed by a proper shaping of the sound insulating and reinforcing core 4, is provided within the door body which receives the elongated hinge pintle 50, the helical compression spring 65, the riding cam member 60 and the swingable cam member 55 or journaling boss 45.

*Method of Assembly*

The door structures A, A′ and A″ and their associated corner brackets B and C or B and D, together with the door operating device F connected to corner bracket B or D, are assembled at the factory as complete door units ready for mounting in the field on the appropriately spaced hinging arms 110 of the pilaster supported hinge brackets, after the hinge bracket supporting pilaster P has been erected and secured to the building floor or the building ceiling. In forming the door body at the factory, the paired facing pans 1 are die cut from flat sheets and shaped for paired assembly to present the notch cut-outs 6 and 10 or 6 and 15 in the rear vertical edge thereof, shaped to receive the corner brackets B, and C or D, with an appropriate hole formed in the front vertical edge thereof to accommodate the door latch assembly E. The insulating and reinforcing core 4 of proper shape is bonded to the inside face of one of the facing pans, the opposite surface of the insulating core is coated with adhesive, the complementary facing pan 1 applied thereto, and the sandwich as thus formed pressed together to insure a firm adhesive bond. Spot welds 3′ are then externally applied at spaced points to the paired outturned lip sections 3 of the paired facing pans to provide a strong and rigid door body.

In cases where the door corner brackets B, C and D to be applied to the door body are chrome finished or otherwise finished in a different color than the door body, the door body and the edge trimming strips 5 are first painted or lacquer finished and hardened by baking. Where the door corner brackets B, C and D are to be finished in the same color as the door body, the painting or finishing operation can be done after the corner brackets have been applied to the door body.

The body section e1 of the latch assembly E is first inserted into the conforming hole formed in the front edge of the door body, and its facing plate e4 is snugly seated against the adjacent rim forming portions of the inturned flange sections 2 extending along the front edge of the door body. The upper edge trimming strip 5a is downwardly telescoped over the upper front lip sections of the door body, and its lower end telescoped over the tongue portion e5 projecting from the upper end of the facing plate e4 of the latch assembly. The lower front edge trimming strip 5b is upwardly telescoped over the lower front lip sections of the door body and the square cut end of the edge trimming strip 5b telescoped over the adjacent tongue portion e5 of the latch assembly. The body section e1 of the latch assembly E is thus rigidly held in operative position.

The upper edge trimming strip 5c may then be telescoped over the paired lip sections 3c extending along the top horizontal edge of the door body, and the adjacent ends of the edge trimming strip 5c and 5a brought into mitre cut abutment, or brought into abutment with a separate corner filler block as desired. The bottom edge trimming strip 5e is similarly telescoped over the paired lip sections 3e extending along the lower horizontal edge of the door body, and the adjacent ends of the edge trimming strips 5e and 5b brought into miter cut abutment, or into abutment with a corner filler block. The upper corner brackets C or D are then applied to the door body.

In the case of the door structure A, as shown in FIG. 1, the S-shaped upper corner bracket C is applied by inserting its U-shaped saddle part 30 into the notch cut-out 10, and the flat inner faces 39 of the edge trimming legs 35, 36 and 37 thereof are simultaneously placed in seating position against the adjacent inturned flange sections 2 of the door body, with the paired rib portions 13, 13′ and 13″ thereof snugly seated within the corresponding longitudinal grooves 39′ presented by the flat inner faces 39 of the edge trimming legs 35, 36 and 37, as shown in FIG. 12. The tongue portion 38 extending from the horizontal edge trimming leg 35 is simultaneously telescoped into the adjacent end of the previously applied edge trimming strip 5c, providing a substantially flush and single line joint between the contoured outer face 35' of the horizontal edge trimming leg 35 of the bracket C and the adjacent outer surface 5' of the edge trimming strip 5c. The rear edge trimming strip 5d is then upwardly telescoped over the paired lip sections 3d extending along the rear vertical edge of the door body, and the upper end of the edge trimming strip 5d telescoped over the downwardly projecting tongue portion 38 extending from the downwardly extending edge trimming leg 37 of the S-shaped upper corner bracket C.

The upper S-shaped corner bracket C as thus assembled to the upper rear corner of the door body of the door structure A, is rigidly locked and held in precise position by a plurality of cooperating interlocking means which includes; the projecting tongue portions 38 which telescope into and interlock with the adjacent ends of the edge trimming strip 5c and 5d; the ribs 13, 13' and 13" which interlock with the longitudinal grooves 39' formed in the inner faces of the tongue portions 39 and the inner faces of the edge trimming legs 35, 36 and 37; the rim forming flanges 33 of the S-shaped bracket C which are snugly pocketed in the inset ledge portions 11 and braced by the paired inset flange portions 12 which define the notch cut-out 10 in the door body; and the grooves 34' defined between the side faces of the block portions 34 and the inside faces of the rim forming flanges 33 of the S-shaped bracket C, in which the inset flange portions 12 of the door body are pocketed. Precise interfit of these interlocking parts is assured by using permanent precision cutting dies and shaping dies to shape all parts of the paired facing pans 1 of the door body, and by precision casting or molding the S-shaped door brackets in precision molding dies.

In the case of the door structures A' and A", the angular shaped upper corner bracket D is applied to the precision shaped upper corner cut-out 15 of its door body, after the door latching assembly E is first applied, followed by the application of the front edge trimming strips 5a and 5b, the upper horizontal edge trimming strip 5c, and the lower horizontal edge trimming strip 5e, to the corresponding outwardly flared lip sections 3 of the door body.

When the door operating device F is to be associated with the upper angular shaped corner bracket D as shown in FIG. 2, the corner bracket D and operating device F are first assembled together as a unit, by fixing the swinging cam member 55 to the base portion 25 of the bracket D as shown in FIGS. 30 and 31, and then telescoping the cylindrical shank section 50' of the elongated hinge pintle 50 through its bearing bore 26a; or in the case of the modified corner bracket D shown in FIG. 36, by telescoping the cylindrical shank section 50' through the bore of its integral bearing boss 45 or the bearing sleeve 46 inserted therein, and which provide an elongated bearing journal for the cylindrical shank section 50' of the elongated hinge pintle 50. The elongated hinge pintle 50 is held in position by a bearing washer 53b as shown in FIGS. 30 and 31 pocketed within the bearing pocket 26' of the bracket, and held against removal by the retainer ring 54. After applying the riding cam member 60 and helical compression spring 65 to the polygonal shank section 50" of the hinge pintle, and securing the same in position by the seating washer 66 and retainer ring 67, as shown in FIGS. 19 and 30, the upper corner bracket D and its associated door operating device F is ready for application to the upper rear corner cut-out 15 of the partially assembled door body.

The upper corner bracket D and its associated door operating device F, and having either a separate swinging cam member 55 fixed to the bracket as shown in FIG. 30, or a bearing boss 45 integral with the corner bracket D, is then applied to the upper rear corner cut-out 15 of the door body as shown in FIG. 27, by first inserting the door operating device F into the clearance space 4' within the door body as provided therefor, and simultaneously telescoping the paired rim forming flanges 44 of the bracket D into interfitted relation with the inset ledge portion 16 of the door body. Substantially simultaneously, the flat underface 42" of its saddle section 42 is placed in seating position against the adjacent flange sections 2 and end extension 2" of the door body shown in FIG. 29, with the locking rib 18 of the door body pocketed within the longitudinal groove 42'" presented by the flat inner face 42" of the saddle section 42 and its projecting tongue portion 47. In the same operation, the terminal end 2'" of the inturned flanges 2 extending along the rear vertical edge of the door body as shown in FIG. 29, are telescoped into the locking groove defined between the flat inside face 48" of the downwardly extending edge trimming leg 48 and the adjacent abutment lug 48a as shown in FIG. 30, or the adjacent abutment wall 45c as shown in FIG. 37. Substantially simultaneously, the flat inside face 48" of the edge trimming leg 48 is snugly seated against the adjacent flange sections 2 of the door body with the laterally projecting rib 18' thereof seated within the longitudinal groove 48'" formed in the flat inside face 48" of the edge trimming leg 48 and associated tongue portion 49. The semi-tubular edge trimming strip 5d is then telescoped over the outwardly flared lip sections 3d extending along the rear vertical edge of the door body, and its upper end snugly telescoped over the tongue portion 49 projecting downwardly from the edge trimming leg 48.

As thus mounted, the upper corner bracket D snugly interfits with and is rigidly locked to the precisely formed upper corner cut-out 15 of the door body by a plurality of locking means which includes; the tongue portion 47 which projects from the saddle section 42 of the bracket and is snugly telescoped into the adjacent end of the semi-tubular edge trimming strip 5c extending along the upper horizontal edge of the door body; the locking rib 18 which is pocketed within the longitudinal groove 42'" formed in the inner face of the saddle section 42 and its tongue portion 47; the terminal end portion 2'" of the door body which is pocketed between the flat inner face 48" of the edge trimming leg 48 and the adjacent abutment lugs 48a or the abutment wall 45c of the corner bracket D; the tongue portion 49 which projects from the downwardly extending edge trimming leg 48 of the corner bracket and into the upper end of the semi-tubular edge trimming strip 5d extending along the rear vertical edge of the door body; the projecting rib 18' of the door body which interlocks with the longitudinal groove 48'" formed in the inside face of the edge trimming leg 48 and its associated tongue portion 49; and the inset ledge portions 16 and inset flange portions 17 of the door body which interlock with the longitudinal grooves 25' defined between the inside faces of the rim forming flanges 24 and the side faces of the base portion 25 or 45a of the corner bracket D.

These interrelated and cooperating lock elements are normally sufficient to rigidly and immovably secure the pintle receiving upper corner bracket D to the door body when the notch cut-out 15 in the door body is precision shaped by precision cutting and forming dies, and when the upper corner bracket D is cast or molded from precision molds. However, if supplemental securing means also appear desirable, a securing screw may be inserted into the aligned holes 42a in the saddle section 22 and end extension 2" of the door body as shown in FIGS. 27 and 29.

Where the upper corner bracket D is to receive a simple hinge pintle 71 only as shown in FIG. 3, the bearing sleeve 46 may be applied to the bearing boss 45 thereof as shown in FIG. 36; and the upper corner bracket D then rigidly attached to the upper corner cut-out 15 of the door body in the manner above described.

As the final assembly operation, the lower angular shaped corner bracket B is applied to the lower rear corner notch cut-out 6 of the door structures A, A' and A" as shown in FIGS. 1, 2 and 3. When the door operating device F is to be associated with the lower corner bracket B as shown in FIGS. 1 and 3, the door operating device F is first assembled therewith as a unit before the corner bracket B is applied to the door body. As heretofore explained, the swinging cam member 55 is affixed to the base portion 25 of the corner bracket B as shown in FIGS. 25 and 26, and the cylindrical shank section 50' of the elongated hinge pintle 50 then telescoped through its bearing bore 26a; or in the case of the modified corner bracket B shown in FIG. 34, by telescoping the cylindrical shank section 50' through the bore 26 of its integral bearing boss 45 or through the bearing sleeve 46 inserted therein, and which provide an elongated bearing journal for the cylindrical shank section 50' of the hinge pintle.

The elongated hinge pintle 50 is held in position by a pair of substantially frictionless nylon bearing washers 53a and 53b as shown in FIG. 15, and which are held against removal by the retainer ring 54. After applying the riding cam member 60 and helical compression spring 65 to the polygonal shank section 50" of the hinge pintle, and securing the same is position by the seating washer 66 and retainer ring 67 as shown in FIGS. 18 and 19, the lower corner bracket B and its associated door operating device F is ready for application to the lower rear corner cut-out 6 of the door body as the final assembly operation.

The lower corner bracket B and its associated door operating device F, and having a separate swinging cam member 55 fixed to the bracket as shown in FIGS. 25 and 26, or a camming boss 45 integral with the corner bracket D as shown in FIG. 34, is then applied to the lower rear corner cut-out 6 of the door body as shown in FIGS. 9 and 10 and FIGS. 15-17, by first inserting the door operating device F into the clearance space 4' within the door body as provided therefor, telescoping the paired rim forming flanges 24 of the door bracket into interfitted relation with the inset ledge portions 7 of the door body, and telescoping the bracket saddle section 22 over the adjacent end of the previously applied edge trimming strip 5e extending along the lower horizontal edge of the door body. In the same operation, the vertically extending edge trimming leg 28 is telescoped over the adjacent flange sections 2 of the door body, with the flat inner face 28" thereof snugly seated against the flange sections 2 and with the locking rib 9 of the door body pocketed within the longitudinal groove 28''' formed in the inside face of the edge trimming leg 28 and its tongue portion 29; and simultaneously telescoping the tongue portion 29 into the adjacent end of the previously applied edge trimming strip 5d extending along the rear vertical edge of the door body, and telescoping the terminal end 2''' of the inturned flange sections 2 of the door body in the groove defined between the inner face 28" of the edge trimming leg 28 and the adjacent face of the abutment lugs 28a or abutment wall 45c of the lower corner bracket B as shown in FIGS. 17 and 37.

As thus mounted, the lower corner bracket B snugly interfits with and is rigidly locked to the precisely formed lower corner cut-out 6 of the door body by a plurality of cooperating locking means which includes; the tongue portion 29 projecting from the edge trimming leg 28 and snugly telescoped into the adjacent end of the semitubular edge trimming strip 5d extending along the rear vertical edge of the door body; the locking ribs 9 which are pocketed within the longitudinal groove 28''' formed in the inner face of the edge trimming leg 28 and its tongue portion 29; the terminal end 2''' of the door body which is pocketed between the flat inner face 28" of the edge trimming leg 28 and the adjacent abutment lugs 28a or abutment wall 45c of the corner bracket B; the rim forming flanges 24 of the lower corner bracket B which are snugly pocketed in the inset ledge portions 7 and braced by the paired inset flange portions 8 which define the notch cut-out 6 in the door body; and with the flange portions 8 locked in the grooves 25' defined between the base portion 25 or 45a of the lower corner bracket B and the inside faces of the rim forming flanges 24. As additional securing means, a securing screw 27' is inserted through the aligned holes 27 in the arcuate facing wall of the saddle section 22 of the bracket, and the aligned holes in the end extension of the edge trimming strip 5e, and the adjacent end extension 2' of the door body which extend into the saddle section 22 of the bracket as shown in FIGS. 16 and 17.

By forming the notch cut-out 6 with precision cutting and shaping dies, and by casting or molding the lower corner bracket B by the use of precision molds, a precise interfit between the lower corner bracket B of the door body and notch cut-out 6 is achieved, and so that the pintle receiving bore 26 or 26a of the swinging cam member 55 or integral bearing boss 45 are in precise axial alignment with the aligned pintle receiving bores 39a provided in the previously applied upper S-shaped corner bracket C of the door structure A of FIG. 1, or the pintle receiving bore 26 or 26a or the tubular boss section 24, 45a, or bearing boss 45 or liner sleeve 46 of the upper angular shaped corner bracket D associated with the door structures A' and A" as shown in FIGS. 2 and 3.

The completed factory made door unit A as shown in FIG. 1, with the door latch assembly E, upper S-shaped corner bracket C, lower angular shaped corner bracket B and door operating device F associated therewith, is mounted in the field on the hinging arms 110 of the previously erected door supporting pilaster P, by first inserting the tapered neck section 51 of the door operating hinge pintle 50 into the tapered bore 110' of the hinging arm 110 of the lower hinge bracket 111. Substantially simultaneously, the saddle part 30 of the upper S-shaped bracket C is telescoped over the hinging arm 110 of the upper pilaster attached hinge bracket 111 and the hinge pintle 70 inserted into the pintle receiving bores 39a of the S-shaped bracket and the bearing hole in the upper hinging arm 110 in alignment therewith. The lock nut 52 is then applied to the threaded end portion 51' of the door operating hinge pintle 50, the door held in the desired residence position, and the lock nut 52 tightened to rigidly and non-rotatably secure the elongated hinge pintle 50 of the door operating device F to the hinging arm 110 in a manner to insure faithful maintenance of the mounted door structure in the desired residence position.

In mounting the door unit A' as shown in FIG. 2, the upwardly projecting tapered neck section 51 of the hinge pintle 50 of the door operating device F associated with the upper angular shaped corner bracket D is first inserted into the tapered bore 110' of the hinging arm 110 of the upper pilaster supported hinge bracket 111. A thrust bearing 53, which may be of the ball bearing type is positioned between the underface 21' of the lower corner bracket B and partially pocketed within the bearing receiving pocket 26' thereof. The hinge pintle 71 may then be inserted through the bearing assembly 53 and the bearing bore 26 or 26a of the lower hinge bracket B, and the hinge pintle 71 secured to the lower hinging arm 110.

In mounting the assembled door structure A" as shown in FIG. 3, the tapered neck section 51 of the elongated hinge pintle 50 of the door operating device F associated with the lower corner bracket B is inserted into the tapered bore 110' of the lower hinging arm 110; and the bore of the integral bearing boss 45 of upper bearing bracket D as shown in FIG. 36, is brought into alignment with the threaded hole 110''' formed in the upper hinging arm 110 of the pilaster supported hinge bracket. The hinge pintle 50, or a simple hinge pintle 71 is then inserted into the integral bearing boss 45, and the threaded neck section of the hinge pintle threaded into the threaded hole 110''' formed in the upper hinging arm 110, with the head section pocketed within the conforming pocket 110" of the hinging arm. The mounted door A" is then swung to the desired residence position, and the lock nut 52 applied to the threaded end position 51 of the door operating hinge pintle associated with the lower corner bracket B, and the nut 52 tightened to thereby rigidly secure the hinge pintle 50 to the lower hinging arm 110.

From the above disclosure, it is apparent that the lower corner bracket B made as above described and applied to the lower corner cut-out 6 of the door body, may also be applied to a corresponding upper corner cut-out in the door body, so that a pair of identical corner brackets B may be associated with the door body. It is also evident that the upper corner bracket D as applied to the upper corner cut-out 15 of the door body, may also be applied to a corresponding corner cut-out formed in the lower corner of the door body.

Since the lower corner bracket B has no tongue portion extending from its saddle section 22, it can be applied to the door structure as the final assembly operation, and after all of the edge trimming strips 5 have been applied to the door body. However, it is evident that both the upper and lower corner brackets may be made to correspond to the corner bracket D having a tongue portion 47 projecting from its saddle section 42, by so arranging the assembly of the door body that both the horizontal edge trimming strips 5c and 5e are applied to the door body after application of the corner brackets D.

It is also evident that when the corner brackets B and D are formed as shown in FIGS. 8 and 28 respectively, they present similar block or platform portions 25, so that a separate swinging cam member 55 as shown in FIGS. 20 and 20A, may be associated with the block or platform portion 25 of either corner bracket or both corner brackets B and D, permitting complete interchangeability of parts. It will also be appreciated that the corner brackets B and D may be cast or molded in one piece to present integral journaling bosses 45 having smooth bearing bores designed to receive the cylindrical shank section of hinge pintle 50 or 71. When the integral bearing bosses 45 are made with inclined cam tracks 57 at the terminal ends thereof, these same corner brackets are adapted to receive the cylindrical shank section of the simple hinge pintle 71, or to alternatively receive the cylindrical shank section 50' of the elongated hinge pintle 50 which is designed to receive the riding cam member 60 and associated helical loading spring 65.

Door structures and bracket assemblies made in accordance with this invention feature flush wall surfaces, and thus can be sanitarily maintained with minimum effort. By using precision cutting and forming dies in making the bracket receiving cut-outs 6, 10 and 15 in the door bodies, and by casting or molding the door brackets B, C and D in precision molds, precise interfit between the door body and door brackets is attained, and precise alignment of the bearing bores provided by the door brackets is further assured.

While certain novel features of this invention have been disclosed herein and are pointed out in the claims, it will be understood that various omissions, substitutions, and changes may be made by those skilled in the art without departing from the spirit of this invention.

What is claimed is:

1. A door operating hinge assembly including, a hinge pintle having a projecting end section designed to be fixed to an exterior hinge bracket and a shank section designed to extend into a door body, a swingable cam member presenting a cam track rotatably journaled on the shank section of said hinge pintle and designed to be fixed to the door body and rotated by the swinging movement of the door body when the door body is swung to and from a non-residence position, a riding cam member supported by said swingable cam member and which presents a cam track designed for camming contact with the cam track of said swingable cam member, said riding cam member being reciprocally but non-rotatably mounted on the shank section of said hinge pintle and reciprocated on said shank section by the rotative movement of said swingable cam member as rotated by the swinging movement of the door body, and means independent of the door body for applying a sufficient camming load to said riding cam member to thereby rotate said swingable cam member and correspondingly swing the door body from non-residence to residence position.

2. A door operating hinge assembly including, a hinge pintle having a projecting end section designed to be fixed to an exterior hinge bracket and a shank section designed to extend into a door body, a swingable cam member presenting a cam track rotatably journaled on the shank section of said hinge pintle and designed to be fixed to the door body and rotated by the swinging movement of the door body when the door body is swung to and from a non-residence position, a riding cam member presenting a cam track designed for camming contact with the cam track of said swingable cam member, said riding cam member being reciprocally but non-rotatably mounted on the shank section of said hinge pintle and reciprocated on said shank section by the rotative movement of said swingable cam member as rotated by the swinging movement of the door body, and means independent of the door body for applying a sufficient camming load to said riding cam member to thereby rotate said swingable cam member and correspondingly swing the door body from non-residence to residence position, said cam loading means comprising a non-rotatable helical compression spring telescoped over the shank section of said hinge pintle with one end thereof supported by the adjacent end of said riding cam member, and means supported by the shank section of said hinge pintle providing a seat for the other end of said helical compression spring, at least one of said cam members being integrally formed from a tough and wear-resistant resin having a low coefficient of surface friction.

3. A door operating hinge assembly including; a hinge pintle having a projecting end section designed to be fixed to an exterior hinge bracket, a cylindrical shank section and a polygonal shank section designed to extend into a door body; a swingable cam member presenting a cam track rotatably journaled on the cylindrical shank section of said hinge pintle and designed to be fixed to the door body and rotated by the swinging movement of the door body when the door body is swung to and from a non-residence position; a riding cam member presenting a cam track designed for camming contact with the cam track of said swingable cam member, said riding cam member being reciprocally but non-rotatably mounted on the polygonal shank section of said hinge pintle and reciprocated on said shank section by the rotative movement of said swingable cam member as rotated by the swinging movement of the door body, and means independent of the door body and within the door body for applying a sufficient camming load to said riding cam member to thereby rotate said swingable cam member and correspondingly swing the door body from non-residence to residence position.

4. A door operating hinge assembly including, a hinge pintle having a projecting end section designed to be fixed to an exterior hinge bracket and a shank section designed to extend into a door body, a swingable cam member rotatably journaled on the shank section of said hinge pintle and designed to be fixed to the door body and rotated by the swinging movement of the door body when the door body is swung to and from a non-residence position, said swingable cam member having a cylindrical body section presenting a cam track at one end thereof, a riding cam member presenting a cam track designed for camming contact with the cam track of said swingable cam member and a skirt extension presenting a cylindrical bore embracing the cylindrical body section of said swingable cam member and journaled thereon, said riding cam member being reciprocally but non-rotatably mounted on the shank section of said hinge pintle and reciprocated on said shank section by the rotative movement of said swingable cam member as rotated by the swinging movement of the door body, and means independent of the door body and within the door body for applying a sufficient camming load to said riding cam member to thereby rotate said swingable cam member and correspondingly swing the door body from non-residence to residence position.

5. A door operating hinge assembly including, a hinge pintle having an end section adapted to be fixed to an exterior bracket and a shank section adapted to extend into a door body, a thrust bearing for swingably supporting the door body telescoped over the end section of said hinge pintle, a swingable cam member rotatably journaled on said hinge pintle, said swingable cam member having a cylindrical body section presenting a cam track at one end thereof and means at the other end thereof for securing the swingable cam member to the door body and whereby said swingable cam member is rotated by the swinging movement of the door body when the door is swung to and from a non-residence position, a riding cam member presenting a cam track designed for camming contact with the cam track of said swingable cam member, and a skirt extension presenting a cylindrical bore embracing the cylindrical body section of said swingable cam member and journaled thereon, said riding cam member being reciprocally but non-rotatably mounted on the shank section of said hinge pintle and reciprocated on said shank section by the rotative movement of said swingable cam member as rotated by the swinging movement of the door body, and means independent of the door body for applying a camming load to said riding cam member and said swingable cam member, at least one of said cam members being integrally cast from a tough and wear-resistant resin compound having a low co-efficient of surface friction.

6. A door operating hinge assembly including, a hinge pintle adapted to be fixed to an exterior bracket and presenting a cylindrical shank section and a polygonal shank section designed to extend into a door body, a swingable cam member rotatably journaled on the cylindrical shank section of said hinge pintle, said swingable cam member having a cylindrical body section presenting a cam track at one end thereof and means at the other end thereof for securing the swingable cam member to the door body, a riding cam member reciprocably but non-rotatably mounted on the polygonal shank section of said hinge pintle, said riding cam member presenting a cam track designed for camming contact with the cam track of said swingable cam member and a skirt extension presenting a cylindrical bore embracing the cylindrical body section of said swingable cam member and journaled thereon, and means within the door body for applying a camming load to said riding cam member and said swingable cam member, said cam loading means comprising a helical compression spring telescoped over said hinge pintle with one end thereof supported by the adjacent end of said riding cam member, and means fixed to said hinge pintle providing a seat for the other end of said helical compression spring, at least one of said cam members being integrally cast from a tough and wear resistant resin compound having a low co-efficient of surface friction.

7. A door operating hinge assembly including, a door bracket having a base section designed for attachment to and for swinging movement with a door body, a boss fixed to said base section and designed to extend into the door body, a pintle receiving bore extending through said boss and base section, a hinge pintle having a projecting end section designed to be fixed to an exterior door supporting hinge member and a shank section extending through said pintle receiving bore and on which the door bracket is swingably journaled, said boss presenting a cam track designed to be rotated in one direction by the swinging movement of the door body when the door body is swung into a non-residence position, a riding cam member presenting a cam track designed for camming contact with the cam track of said boss, said riding cam member being reciprocally but non-rotatably mounted on the shank section of said hinge pintle and reciprocated on said shank section by the rotative movement of said boss as rotated by the swinging movement of said door bracket and door body, and means independent of the door body for applying a sufficient camming load on said riding cam member to thereby rotate said boss and door bracket in the opposite direction and correspondingly swing the door body from non-residence to residence position.

8. A door operating hinge assembly including, a door bracket having a base section designed for attachment to and for swinging movement with a door body, a boss fixed to said base section and designed to extend into the door body, a pintle receiving bore extending through said boss and base section, a hinge pintle having a projecting end section designed to be fixed to an exterior door supporting hinge member and a shank section extending through said pintle receiving bore and on which said door bracket is swingably journaled, a bearing telescoped over the projecting end section of said hinge pintle and designed to swingably support the door bracket, said boss presenting a cam track designed to be rotated in one direction by the swinging movement of the door body when the door body is swung into a non-residence position, a riding cam member presenting a cam track designed for camming contact with the cam track of said boss, said riding cam member being reciprocally but non-rotatably mounted on the shank section of said hinge pintle and reciprocated on said shank section by the rotative movement of said boss as rotated by the swinging movement, of said door bracket and door body, and means independent of the door body for applying a sufficient camming load on said riding cam member to thereby rotate said boss and door bracket in the opposite direction and correspondingly swing the door body from non-residence to residence position, said cam loading means comprising a helical compression spring telescoped over the shank section of said hinge pintle with one end thereof supported by the adjacent end of said riding cam member, and means supported by the shank section of said hinge pintle providing a seat for the other end of said helical compression spring.

9. A door operating hinge assembly including; a door bracket having a base section designed for attachment to and for swinging movement with a door body, a boss fixed to said base section and designed to extend into the door body, a pintle receiving bore extending through said boss and base section, a hinge pintle having a cylindrical shank section extending through said pintle receiving bore and on which said door bracket is swingably journaled, and end section projecting from one end of said cylindrical shank section and exterior to the base section of said door bracket and designed to be fixed to an exterior door supporting hinge member, a polygonal shank section projecting from the other end of said cylindrical shank section and designed to extend into a door body, said boss presenting a cam track designed to be rotated in one direction by the swinging movement of the door body when the door body is swung into a non-residence position, a riding cam member reciprocably but non-rotatably mounted on the polygonal shank section of said hinge pintel, said riding cam member presenting a cam track designed for camming contact with the cam track of said boss, and means within the door body for applying a sufficient camming load on said riding cam member to thereby rotate said boss and door bracket in the opposite direction and correspondingly swing the door body from non-residence to residence position.

10. A door operating hinge assembly including; a door bracket having a base section designed for attachment to and for swinging movement with a door body, a boss fixed to the base section and designed to extend into the door body, a pintle receiving bore extending through said boss and base section, a hinge pintle having a projecting end section designed to be fixed to an exterior door supporting hinge member and a shank section extending through said pintle receiving bore and on which said door bracket is swingably journaled, said boss presenting a cylindrical body section and a cam track at one end thereof designed to be rotated in one direction by the swinging movement of the door body when the door body is swung into a non-residence position, a riding cam member presenting a cam track designed for camming contact with the cam track presented by the cylindrical body section of said boss, and a skirt extension presenting a cylindrical bore embracing the cylindrical body section of said boss and journaled thereon, said riding cam member being reciprocally but non-rotatably mounted on the shank section of said hinge pintle and reciprocated on said shank section by the rotative movement of the cylindrical body section of said boss as rotated by the swinging movement of said door bracket and door body, and means independent of the door body and within the door body for applying a sufficient camming load on said riding cam member to thereby rotate said boss and door bracket in the opposite direction and correspondingly swing the door body from non-residence to residence position.

11. A door operating hinge assembly including, a door bracket having a base section designed for attachment to and for swinging movement with a door body, a boss fixed to said base section and designed to extend into the door body, a pintle receiving bore extending through said boss and base section, a hinge pintle having a projecting end section adapted to be fixed to an exterior door supporting member and a shank section extending through said pintle receiving bore and on which said door bracket is swingably journaled, a bearing for swingably supporting the door bracket and door body telescoped over the projecting end section of said pintle, said boss having a cylindrical body section presenting a cam track at one end thereof, a riding cam member presenting a cam track designed for camming contact with the cam track presented by the cylindrical body section of said boss, and a skirt extension presenting a cylindrical bore embracing the cylindrical body section of said boss and journaled thereon, said riding cam member being reciprocally but non-rotatably mounted on the shank section of said hinge pintle and reciprocated on said shank section by the rotative movement of the cylindrical body section of said boss as rotated by the swinging movement of said door bracket and door body, and means independent of the door body for applying a camming load on said riding cam member and said boss and door bracket, at least one of said cam tracks being formed from a tough and wear-resistant resin compound having a low co-efficient of surface friction.

12. A door operating hinge assembly including; a door bracket having a base section designed for attachment to and for swinging movement with a door body, a boss fixed to said base section and designed to extend into the door body, a pintle receiving bore extending through said boss and base section, a hinge pintle having a cylindrical shank section extending through said pintle receiving bore and on which said door bracket is swingably journaled, an end section projecting from one end of said cylindrical shank section and exterior to the base section of the door bracket and designed to be fixed to an exterior door supporting hinge member, and a polygonal shank section projecting from the other end of said cylindrical shank section and designed to extend into the door body, said boss presenting a cylindrical wall and a cam track designed to be rotated in one direction by the swinging movement of the door body when the door body is swung into a non-residence position, a riding cam member reciprocably but non-rotatably mounted on the polygonal shank section of said hinge pintle, said riding cam member presenting a cam track designed for camming contact with the cam track presented by the cylindrical wall of said boss, and a skirt extension presenting a cylindrical bore embracing the cylindrical wall of said boss and journaled thereon, and means within the door body for applying a sufficient camming load on said riding cam member to thereby rotate said boss and door bracket in the opposite direction and correspondingly swing the door body from non-residence to residence position.

13. A door operating hinge assembly including; a door bracket having a base section designed for attachment to and for swinging movement with a door body, a boss fixed to said base section and designed to extend into the door body, a pintle receiving bore extending through said boss and base section, a hinge pintle having a cylindrical shank section extending through said pintle receiving bore and on which said door bracket is swingably journaled, an end section projecting from one end of said cylindrical shank section and exterior to the base section of said door bracket and designed to be fixed to an exterior door supporting hinge member, and a polygonal shank section projecting from the other end of said cylindrical shank section and designed to extend into a door body, a thrust bearing supported by the projecting end section of said hinge pintle and designed to swingably support the door bracket, said boss presenting a cylindrical wall and a cam track designed to be rotated in one direction by the swinging movement of the door body when the door body is swung into a non-residence position, a riding cam member reciprocably but non-rotatably mounted on the polygonal shank section of said hinge pintle, said riding cam member presenting a cam track designed for camming contact with the cam track presented by the cylindrical wall of said boss, and a skirt extension presenting a cylindrical bore embracing the cylindrical wall of said boss and journaled thereon, and means within the door body for applying a sufficient camming load on said riding cam member to thereby rotate said boss and door bracket in the opposite direction and correspondingly swing the door body from non-residence to residence position, said cam loading means comprising a non-rotatable helical compression spring telescoped over said pintle rod with one end thereof supported by the adjacent end of said riding cam member, and means fixed to said hinge pintle providing a seat for the other end of said helical compression spring.

References Cited in the file of this patent

UNITED STATES PATENTS

| | | |
|---|---|---|
| 2,566,872 | Bernhardt | Sept. 4, 1951 |
| 2,735,144 | Anderson et al. | Feb. 21, 1956 |
| 2,747,238 | Jones et al. | May 29, 1956 |
| 2,835,325 | Gilbert et al. | May 20, 1958 |
| 2,878,531 | Benham | Mar. 24, 1959 |
| 2,904,824 | Kuehl | Sept. 22, 1959 |

FOREIGN PATENTS

| | | |
|---|---|---|
| 346,131 | Switzerland | June 15, 1960 |